US012172281B2

(12) United States Patent
Machida et al.

(10) Patent No.: US 12,172,281 B2
(45) Date of Patent: Dec. 24, 2024

(54) POWER TOOL HAVING A HAMMER MECHANISM

(71) Applicant: MAKITA CORPORATION, Anjo (JP)

(72) Inventors: Yoshitaka Machida, Anjo (JP); Taro Hisano, Anjo (JP); Kazuki Nakagawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/201,312

(22) Filed: May 24, 2023

(65) Prior Publication Data

US 2023/0415321 A1 Dec. 28, 2023

(30) Foreign Application Priority Data

Jun. 24, 2022 (JP) ................................. 2022-101564
Jun. 24, 2022 (JP) ................................. 2022-101565

(51) Int. Cl.
*B25D 16/00* (2006.01)
*B25D 17/04* (2006.01)

(52) U.S. Cl.
CPC ......... *B25D 16/006* (2013.01); *B25D 17/043* (2013.01); *B25D 2211/061* (2013.01)

(58) Field of Classification Search
CPC ............................ B25D 16/006; B25D 17/043
See application file for complete search history.

(56) References Cited

U.S. PATENT DOCUMENTS 7,500,527 B2 * 3/2009 Fischer ................ B25D 17/043 173/210
7,705,497 B2 * 4/2010 Arich ..................... B25D 17/20 310/58
2006/0086515 A1 * 4/2006 Engelfried ........... B25D 17/043 173/162.1
2012/0279740 A1 11/2012 Furusawa et al.
2015/0144366 A1 5/2015 Machida

FOREIGN PATENT DOCUMENTS

DE 102010062450 A1 * 6/2012 ............. B25D 17/24
EP 2384859 A2 * 11/2011 ........... B25D 17/043
JP 5502458 B2 5/2014

* cited by examiner

*Primary Examiner* — Nathaniel C Chukwurah
(74) *Attorney, Agent, or Firm* — Oliff PLC

(57) ABSTRACT

A power tool having a hammer mechanism has a tool body that houses a motor and a driving mechanism and extends in a front-rear direction; a handle including a grip part that extends in an up-down direction orthogonal to the front-rear direction behind the tool body and has a lower end formed as a free end and is arranged below the driving axis; and a plurality of biasing members configured to elastically connect the tool body and the handle. The biasing members include at least one first biasing member arranged above the driving axis in the up-down direction, and at least one second biasing member arranged below the driving axis in the up-down direction. In this power tool, a biasing force of the at least one second biasing member is larger than a biasing force of the at least one first biasing member.

17 Claims, 14 Drawing Sheets

POWER TOOL HAVING A HAMMER MECHANISM

CROSS-REFERENCE TO RELATED APPLICATIONS

The present application claims priority to Japanese patent application Nos. 2022-101564 filed on Jun. 24, 2022, and 2022-101565 filed on Jun. 24, 2022. The contents of the foregoing applications are hereby fully incorporated herein by reference.

TECHNICAL FIELD

The present disclosure relates to a power tool having a hammer mechanism and configured to linearly drive a tool accessory.

BACKGROUND

In a power tool having a hammer mechanism and configured to perform a machining operation on a workpiece by linearly driving a tool accessory along a driving axis, large vibration may be caused particularly in the extending direction of the driving axis. To cope with this, various vibration isolating structures have been provided. For example, in a power tool (rotary hammer) having a hammer mechanism disclosed in Japanese patent No. 6334144, a handle is elastically connected to a tool body for housing a motor and a driving mechanism by a biasing member so as to be movable in the extending direction of the driving axis. A user performs a machining operation with the power tool while pressing a grip part (handle) against a workpiece.

SUMMARY

The structure disclosed in Japanese patent No. 6334144 can effectively reduce the possibility that vibration caused in the extending direction of the driving axis is transmitted from the tool body to the handle during machining operation. Where a grip part is arranged below the driving axis and a lower end of the grip part (the handle) is a free end, however, the power tool having a hammer mechanism easily tilts in a direction in which the lower end of the handle moves toward a workpiece, during machining operation.

It is accordingly a non-limiting object of the present disclosure to provide a technique that helps stabilize the attitude of a power tool having a hammer mechanism during machining operation.

According to one aspect of the present disclosure, a power tool having a hammer mechanism and configured to linearly drive a tool accessory is provided. The power tool has a motor, a driving mechanism, a tool body, a handle and a plurality of biasing members. The driving mechanism is configured to drive the tool accessory along a driving axis that defines a front-rear direction of the power tool, by power of the motor. The tool body houses the motor and the driving mechanism and extends in the front-rear direction. The handle includes a grip part. The grip part extends behind the tool body in an up-down direction orthogonal to the front-rear direction. A lower end of the grip part is formed as a free end. The biasing members are configured to elastically connect the tool body and the handle and bias the tool body and the handle in directions away from each other in the front-rear direction. The biasing members include at least one first biasing member arranged above the driving axis in the up-down direction, and at least one second biasing member arranged below the driving axis in the up-down direction. A biasing force of the at least one second biasing member is larger than a biasing force of the at least one first biasing member.

With the power tool having a hammer mechanism, where the tool body and the handle are elastically connected, machining operation is performed while the grip part is pressed toward a workpiece. In the power tool having a hammer mechanism, where the grip part is offset downward relative to the driving axis and a lower end of the grip part (the handle) is a free end, the grip part is relatively apart from the driving axis. Therefore, the handle (the power tool) easily tilts in a direction in which the lower end of the handle moves toward a workpiece. In the power tool having a hammer mechanism according to the above-described aspect, a biasing force of the at least one second biasing member is larger than a biasing force of the at least one first biasing member, which means that a biasing force on the side close to the grip part is larger than a biasing force on the side far from the grip part. This suppresses tilting of the handle during machining operation, so that the attitude of the power tool having a hammer mechanism is stabilized during machining operation.

DETAILED DESCRIPTION OF THE EMBODIMENTS

Figure 1:
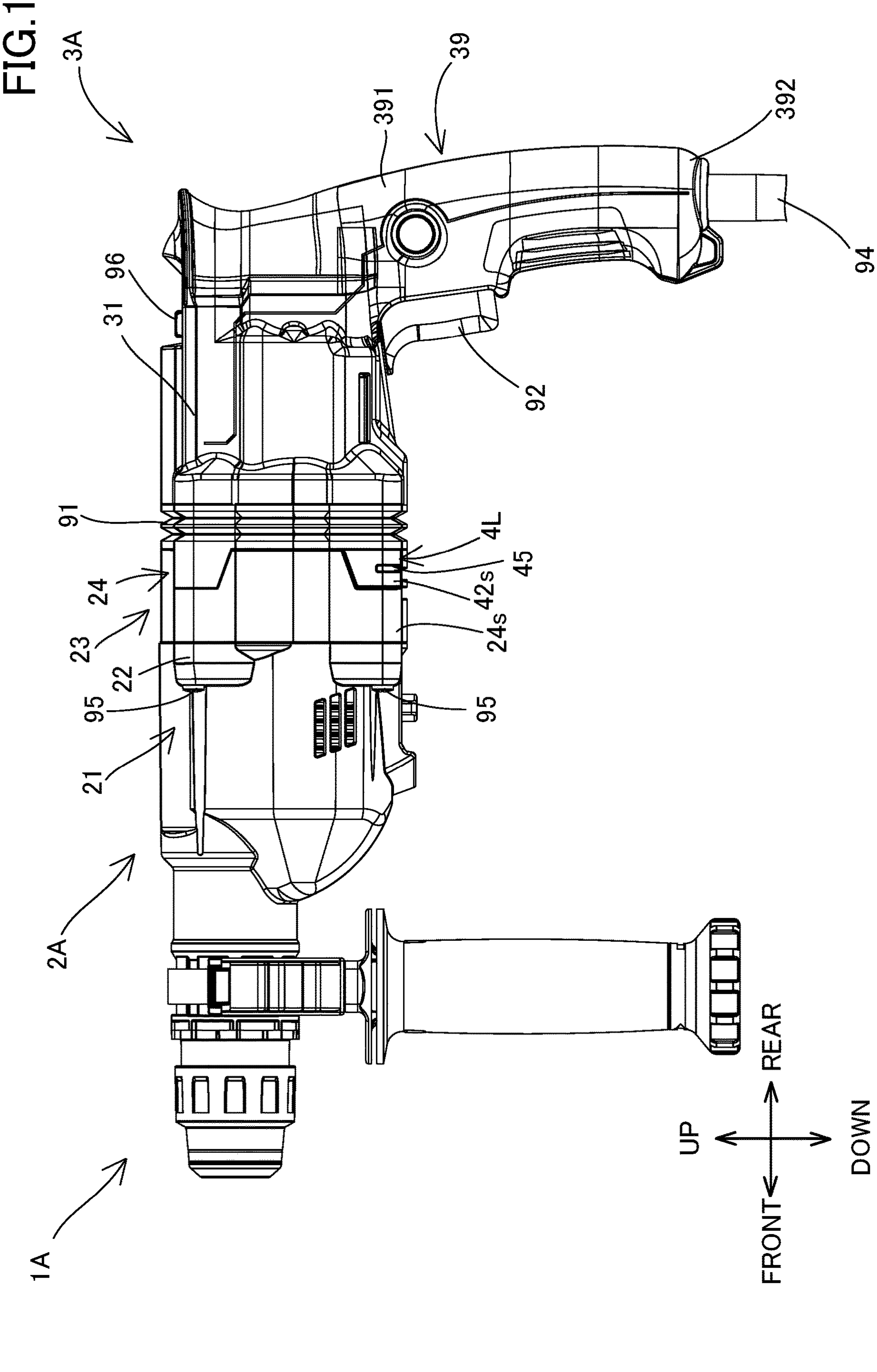
FIG. 1 is an outside view of a rotary hammer.

In one non-limiting embodiment according to the present disclosure, the at least one first biasing member and the at least one second biasing member may have the same specifications. The number of the at least one second biasing member may be larger than that of the at least one first biasing member.

According to this embodiment, the biasing force on the side close to the grip part can be larger than the biasing force on the side far from the grip part while the biasing members having the same specifications are used. This reduces the cost for suppressing tilting of the power tool having a hammer mechanism during machining operation. The biasing members having the same specifications refer to biasing members formed of the same material in the same shape.

In addition or in the alternative to the preceding embodiments, the number of the at least one first biasing member may be one, and the number of the at least one second biasing member may be two.

According to this embodiment, the biasing force on the side close to the grip part can be larger than the biasing force on the side far from the grip part. This suppresses tilting of the power tool having a hammer mechanism during machining operation.

In addition or in the alternative to the preceding embodiments, the two second biasing members may be arranged symmetrically to an imaginary plane including the driving axis and extending in the up-down direction.

According to this embodiment, the biasing forces acting between the tool body and the handle on the lower side below the driving axis are equalized in the left-right direction, so that the machining operation can be stably performed.

In addition or in the alternative to the preceding embodiments, the at least one second biasing spring may have a larger spring constant than the at least one first biasing spring.

According to this embodiment, the biasing force on the side close to the grip part can be made larger than the biasing force on the side far from the grip part by utilizing the difference in spring constant.

In addition or in the alternative to the preceding embodiments, the at least one second biasing spring may be arranged between the tool body and the handle with a larger initial load applied thereto than that applied to the at least one first biasing spring.

According to this embodiment, the biasing force on the side close to the grip part can be made larger than the biasing force on the side far from the grip part by utilizing the difference in initial load. The state that “an initial load is applied” to the biasing spring refers to the state that a load is applied to the biasing spring in the compressing direction in a static state and the biasing spring is compressed.

In addition or in the alternative to the preceding embodiments, the at least one second biasing spring may be arranged forward of the at least one first biasing spring.

According to this embodiment, compared with a structure in which the at least one first biasing spring is arranged forward of the at least one second biasing spring, a space behind the second biasing spring (in front of the upper end of the grip part) can be effectively utilized. Thus, the power tool having a hammer mechanism can be more compact.

In addition or in the alternative to the preceding embodiments, the tool body may include a motor housing that houses the motor and is arranged in a rear part of the tool body. The handle may include a cover part that at least partially surrounds the motor housing. An upper end of the grip part may be connected to the cover part.

According to this embodiment, tilting of the handle during machining operation is suppressed while the motor housing is covered with the handle.

Representative, non-limiting embodiments of the present disclosure are now specifically described with reference to the drawings.

First Embodiment

A rotary hammer 1A according to one representative, non-limiting embodiment of the present disclosure is now described with reference to FIGS. 1 to 12. The rotary hammer 1A is described as a representative example of a power tool (a power tool having a hammer mechanism) capable of linearly driving a tool accessory 101 by striking the tool accessory 101. More specifically, the rotary hammer 1A is a power tool capable of performing motion of linearly driving the tool accessory 101 along a prescribed driving axis A1 (hereinafter referred to as hammering motion) and motion of rotationally driving the tool accessory 101 around the driving axis A1 (hereinafter referred to as rotating motion).

As shown in FIG. 1, the rotary hammer 1A mainly includes a tool body 2A, a handle 3A and a plurality of biasing members that elastically connect the tool body 2A and the handle 3A. In this embodiment, as shown in FIGS. 2 to 5, the rotary hammer 1A has three biasing springs (a first biasing spring 51 and second biasing springs 52L, 52R) as the biasing members.

Figure 2:
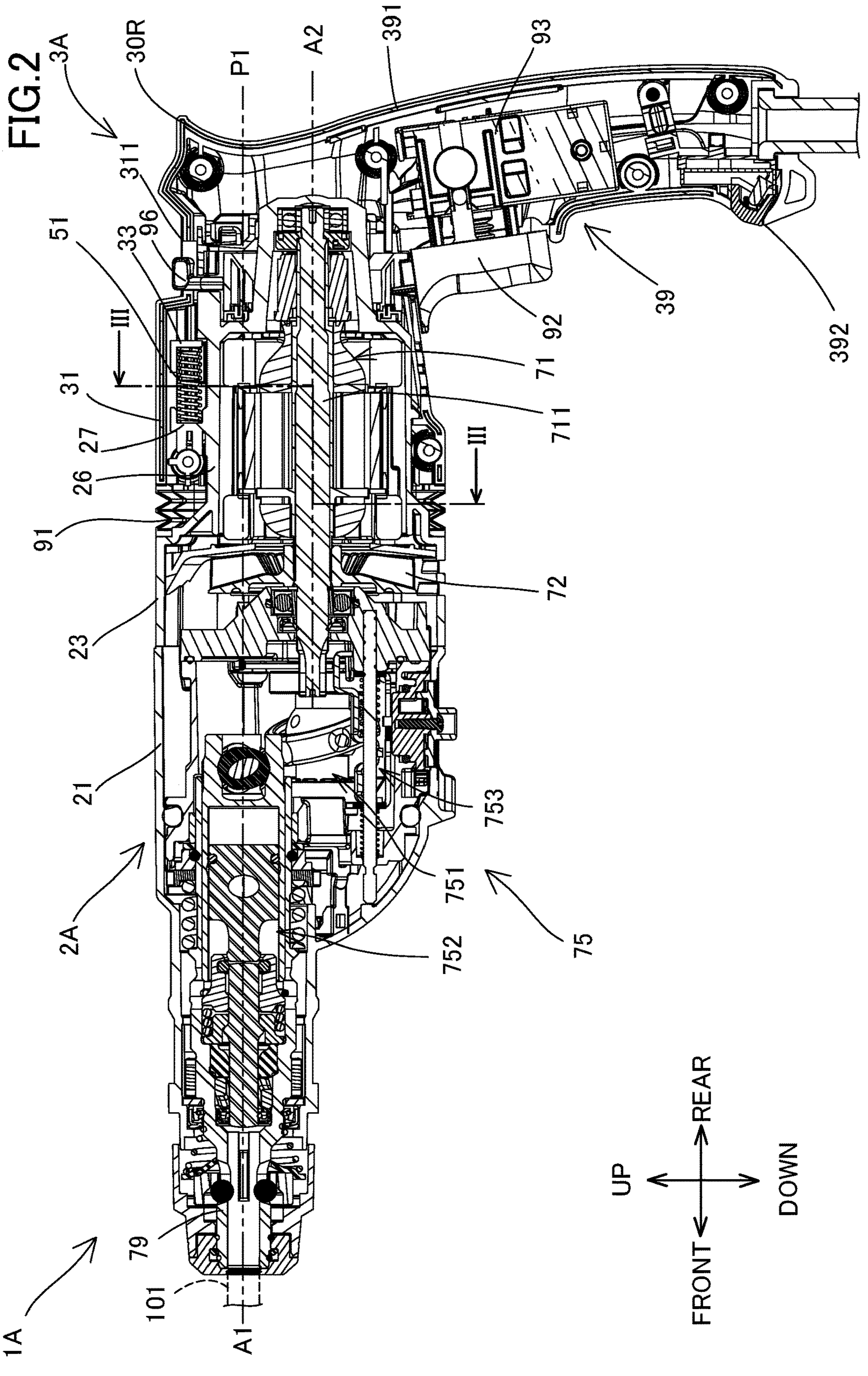
FIG. 2 is a sectional view of the rotary hammer.

The tool body 2A is a hollow body that houses main mechanisms of the rotary hammer 1A. The tool body 2A is also referred to as a body housing, an outer housing or a body part. As shown in FIG. 2, the tool body 2A extends along the driving axis A1 of the tool accessory 101. A tool holder 79 is arranged within one end part of the tool body 2A in the extending direction of the driving axis A1 (hereinafter simply referred to as a driving axis direction). The tool holder 79 is configured such that the tool accessory 101 is removably mounted thereto. The tool body 2A mainly houses a motor 71 and a driving mechanism 75 that is configured to drive the tool accessory 101 held by the tool holder 79, by power of the motor 71. In this embodiment, the motor 71 is arranged such that a rotational axis A2 of a motor shaft 711 that rotates integrally with a rotor extends in parallel to the driving axis A1. In this embodiment, a motor with a brush is adopted as the motor 71.

The handle 3A is separately formed from the tool body 2A. The handle 3A is connected to the tool body 2A so as to be movable relative to the tool body 2A in the driving axis direction. The handle 3A has a grip part 39 configured to be held by a user. The grip part 39 extends to protrude from the tool body 2A in a direction crossing the driving axis A1 (more specifically, a direction substantially orthogonal to the driving axis A1 and the rotational axis A2). A protruding end 392 of the grip part 39 is a free end. The grip part 39 has a trigger 92 that is configured to be manually depressed by a user. The rotary hammer 1A performs hammering motion and/or rotating motion when the motor 71 is energized in response to depressing operation of the trigger 92 and the driving mechanism 75 is driven.

The structure of the rotary hammer 1A is now described in detail. In the following description, for convenience sake, the extending direction of the driving axis A1 (the longitudinal direction of the tool body 2A) is defined as a front-rear direction of the rotary hammer 1A. In the front-rear direction, the side on which the tool holder 79 is arranged is defined as the front side of the rotary hammer 1A, and the opposite side is defined as the rear side of the rotary hammer 1A. A direction (orthogonal to the driving axis A1 and the rotational axis A2) substantially corresponding to the extending direction of the grip part 39 is defined as an up-down direction of the rotary hammer 1A. In the up-down direction, a base end 391 side of the grip part 39 is defined as an upper side of the rotary hammer 1A, and a protruding end 392 side of the grip part 39 is defined as a lower side of the rotary hammer 1A. A direction orthogonal to the front-rear direction and the up-down direction is defined as a left-right direction of the rotary hammer 1A. Further, in the following description, for convenience of explanation, an imaginary plane including the driving axis A1 and orthogonal to the up-down direction is referred to as a plane P1, and an imaginary plane including the driving axis A1 and parallel to the up-down direction is referred to as a plane P2 (see FIG. 3). In this embodiment, the handle 3A has two halves (a left part 30L and a right part 30R) connected together in the left-right direction. The handle 3A is divided into the left part 30L and the right part 30R by the plane P2.

The structure of the tool body 2A and the structures of elements disposed therein are now described.

The tool body 2A includes a gear housing 21, a motor housing 23, two holder receiving parts 63L, 63R, a plurality of guide parts 28 and a first spring holding part 27.

As shown in FIG. 2, the gear housing 21 is a hollow body that houses the driving mechanism 75. The gear housing 21 forms a front half of the tool body 2A. A front end part of the gear housing 21 has a circular cylindrical shape and the tool holder 79 is arranged therein, and the other part of the gear housing 21 has a generally rectangular cylindrical shape. The driving mechanism 75 incudes a motion converting mechanism 751 and a striking mechanism 752 for performing hammering motion and a rotation transmitting mechanism 753 for performing rotating motion, which is a well-known structure and is therefore not described in detail. In this embodiment, a mechanism for converting rotation into linear motion by using an oscillating member (such as a swash bearing and a wobble plate/bearing) and a piston is adopted as the motion converting mechanism 751. A motion converting mechanism, for example, using a crank shaft in place of the oscillating member may however be adopted as the motion converting mechanism 751. A reduction gear mechanism having a plurality of gears is adopted as the rotation transmitting mechanism 753.

In this embodiment, the rotary hammer 1A has three action modes, i.e. "hammering only" mode of performing only hammering motion, "rotation only" mode of performing only rotating motion, and "hammering with rotation" mode of performing hammering motion and rotating motion at the same time. Although this is also a well-known structure and is therefore not shown and described in detail, the driving mechanism 75 operates according to the action mode selected by a user via a mode changing knob.

As shown in FIG. 2, the motor housing 23 is a hollow body that houses the motor 71. The motor housing 23 is a single (jointless, one-piece) member formed separately from the gear housing 21. The motor housing 23 forms a rear half of the tool body 2A. The motor housing 23 is formed of synthetic resin.

Figure 4:
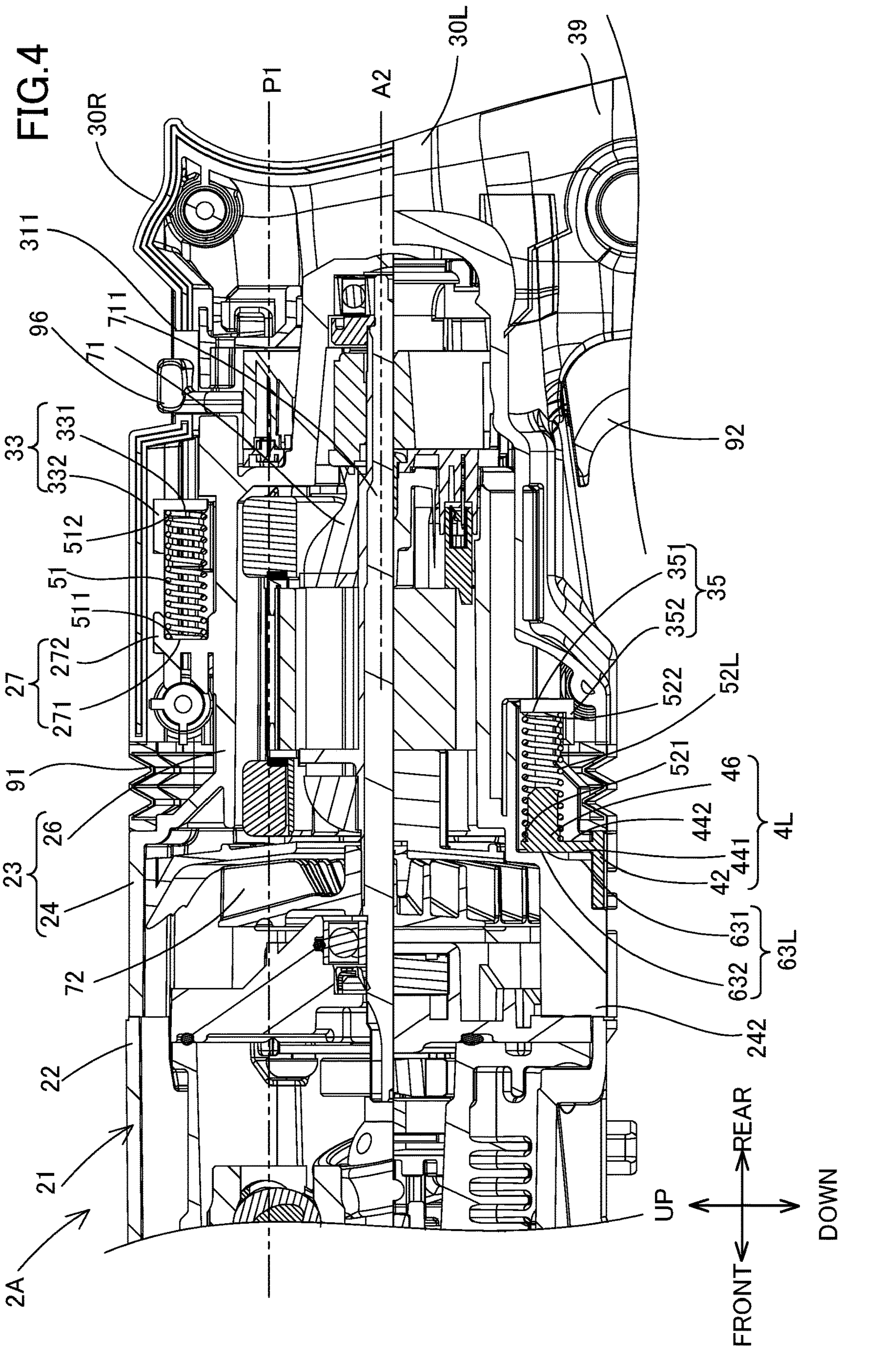
FIG. 4 is a sectional view of the rotary hammer, taken along line IV-IV in FIG. 3.

The motor housing 23 has a generally cylindrical shape having an open front end and a closed rear end. As shown in FIG. 4, the motor housing 23 has a front part 24 and a rear part 26. The front part 24 has substantially the same shape (the same outer diameter and the same inner diameter) as the rear end part 22 of the gear housing 21. The outer diameter of the rear part 26 is smaller than that of the front part 24 and a rear end of the rear part 26 is closed. A fan 72 is fixed to a front end part of the motor shaft 711 and arranged within the front part 24. Most of the motor 71 is arranged within the rear part 26.

The guide parts 28 are now described with reference to FIGS. 3, 5 and 10. The guide parts 28 are configured to guide the handle 3A to slide relative to the tool body 2A. In this embodiment, the guide parts 28 are arranged in a plurality of positions in a circumferential direction around the rotational axis A2 on an outer surface of the rear part 26.

Figure 3:
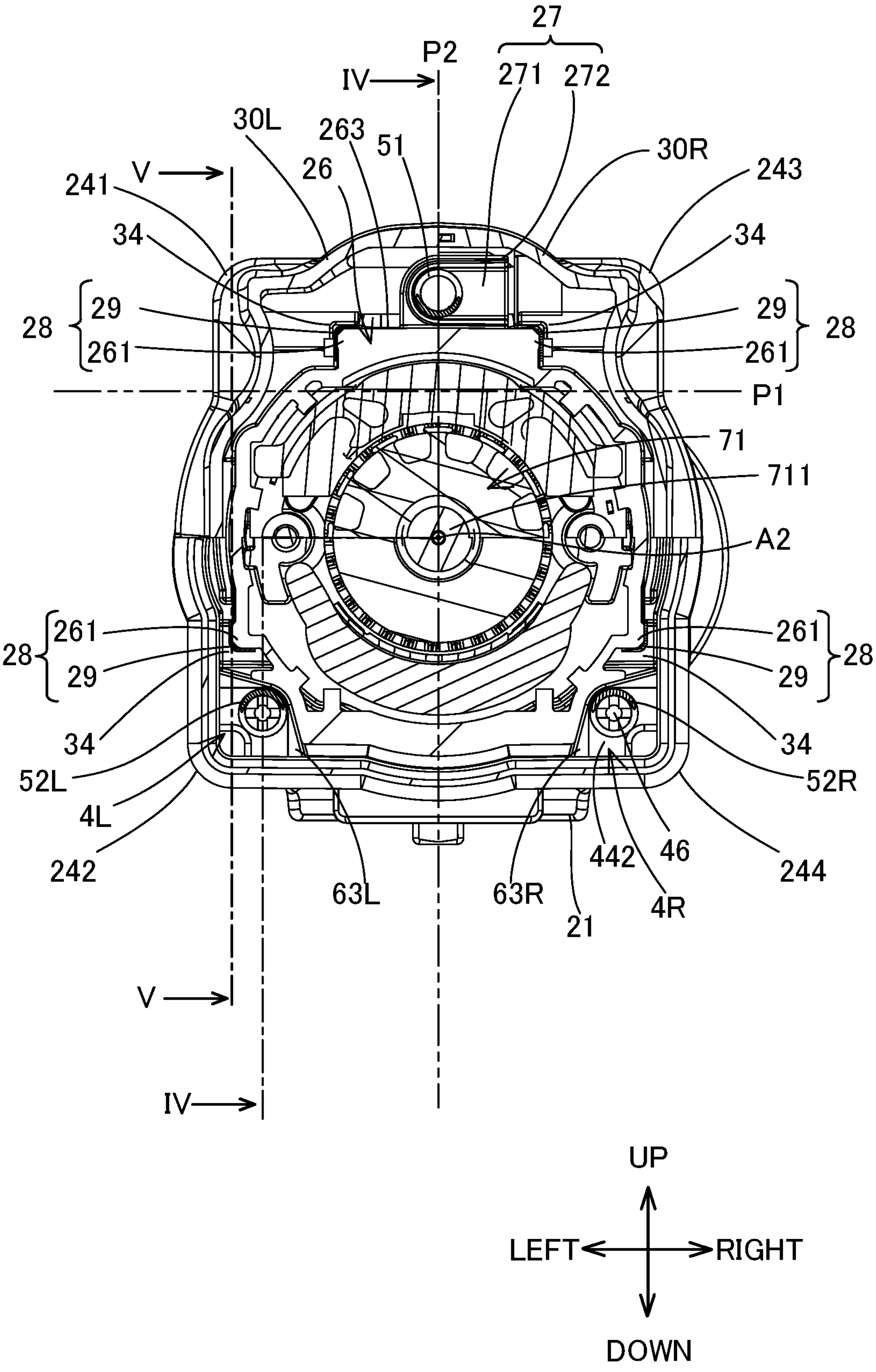
FIG. 3 is a sectional view of the rotary hammer, taken along line III-III in FIG. 2.

As shown in FIG. 3, each of the guide parts 28 includes an L-shaped (corner) part 261 and a guide plate 29. The L-shaped parts 261 are formed in upper and lower parts of the rear part 26 on the left and right sides of the plane P2. The L-shaped parts 261 each extend in the front-rear direction.

The guide plate 29 is provided to cover the L-shaped part 261. In FIG. 10, the guide parts 28 (the guide plates 29) provided in the upper and lower parts of the rear part 26 on the right side of the plane P2 are shown. The guide plate 29 is formed, for example, of metal material. The two guide parts 28 on the left side of the plane P2 and the two guide parts 28 on the right side of the plane P2 are arranged symmetrically to the plane P2. In this manner, the four guide parts 28 are provided in the motor housing 23.

Figure 5:
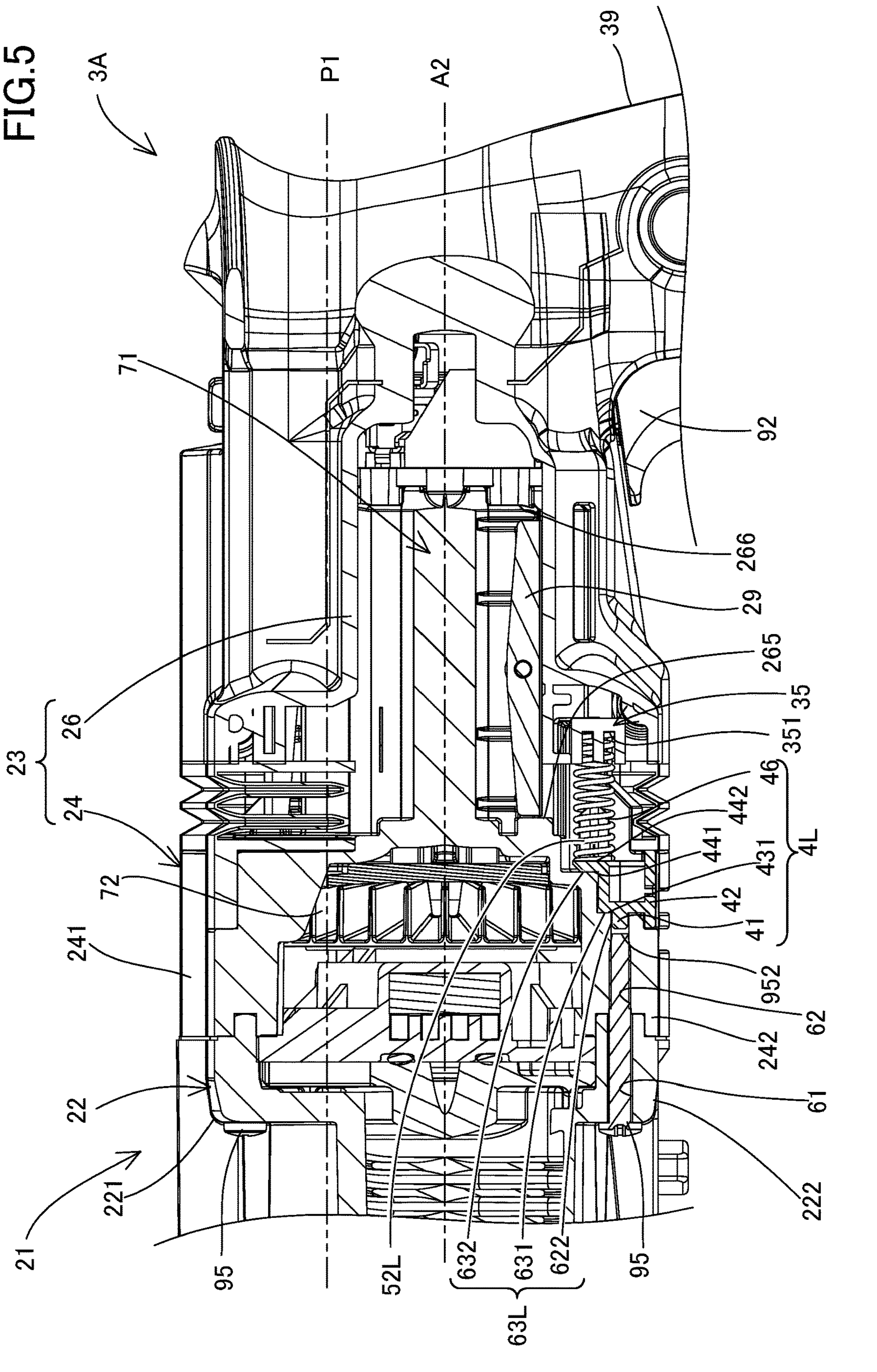
FIG. 5 is a sectional view of the rotary hammer, taken along line V-V in FIG. 3.
Figure 6:
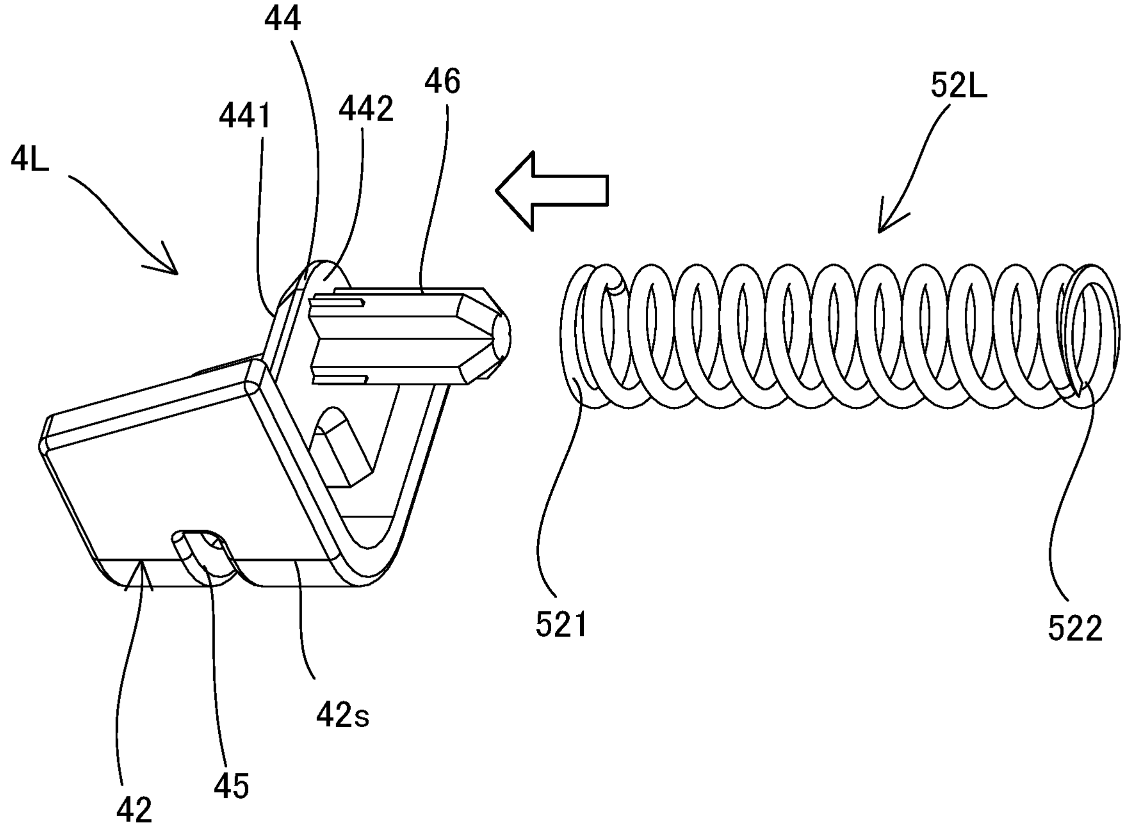
FIG. 6 shows a spring holder and a second biasing spring.
Figure 10:
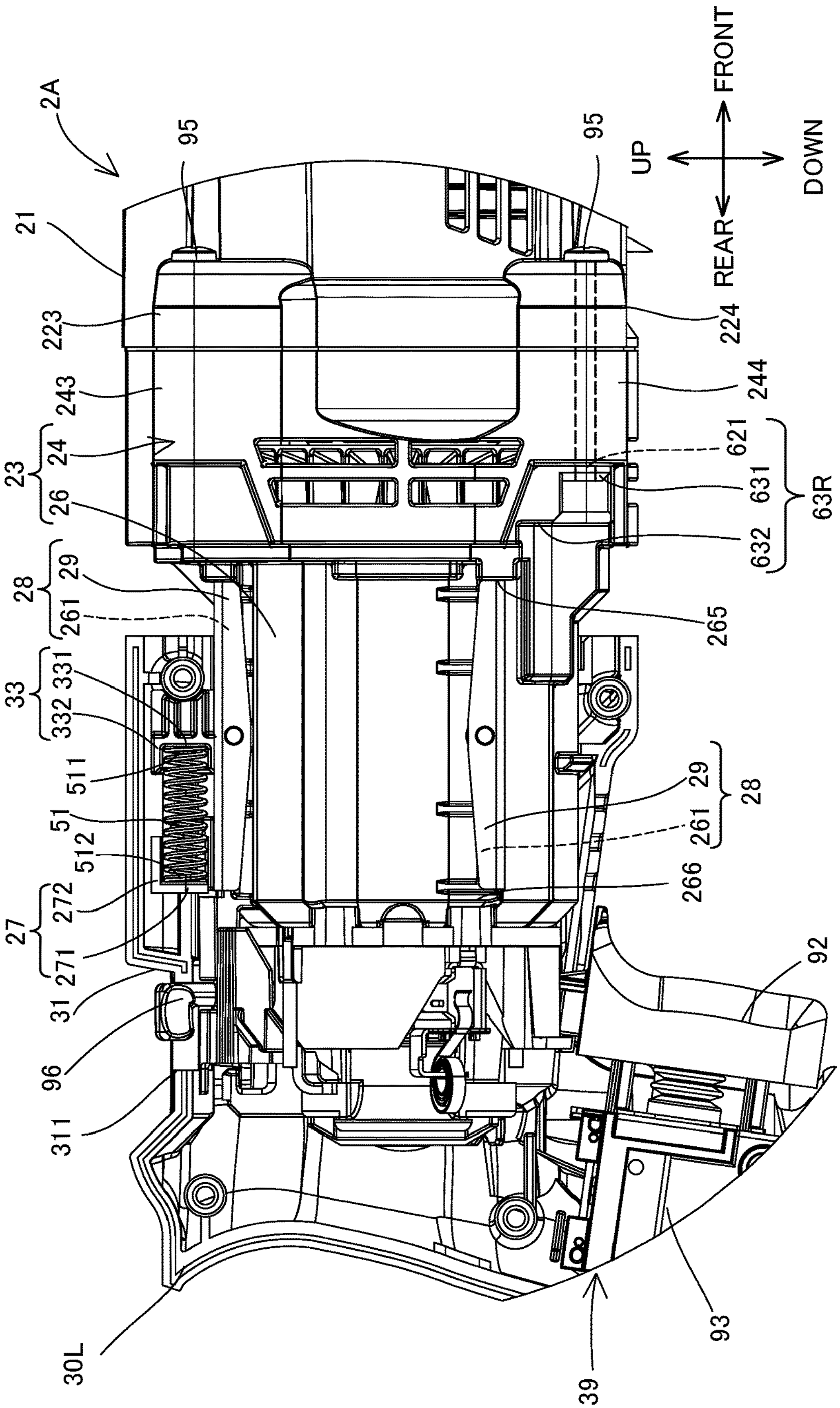
FIG. 10 is a partial, enlarged view of FIG. 9.

As shown in FIGS. 5 and 10, a front wall 265 and a rear wall 266 are provided orthogonally to the front-rear direction in front of and behind each of the L-shaped parts 261 of the rear part 26. The front wall 265 and the rear wall 266 respectively abut guide receiving parts 34 (described below) of the handle 3A when the handle 3A slides in the front-rear direction and thereby define the moving range of the handle 3A in the front-rear direction.

In this embodiment, the gear housing 21 and the motor housing 23 are fixedly connected in the front-rear direction. A connection part between the gear housing 21 and the motor housing 23 is now described.

In FIG. 5, part of the gear housing 21 and part of the motor housing 23 on the left side of the plane P2 are shown. The structure of the connection part between the gear housing 21 and the motor housing 23 is symmetrical to the plane P2.

The rear end part 22 of the gear housing 21 protrudes in a direction further away from the plane P2 than the other part of the gear housing 21 (see FIGS. 5 and 10). Left upper, left lower, right upper and right lower protruding parts (L-shaped parts) 221, 222, 223, 224 of the rear end part 22 are hereinafter also referred to as first connection parts 221, 222, 223, 224. For example, the left upper and left lower first connection parts 221, 222 are shown in FIG. 5, and the right upper and right lower first connection parts 223, 224 are shown in FIG. 10. As illustrated by the first connection part 222 in FIG. 5, each of the first connection parts 221, 222, 223, 224 has a hole 61 formed through the rear end part 22 in the front-rear direction.

As shown in FIGS. 3, 5 and 10, the front part 24 of the motor housing 23 has left upper, left lower, right upper and right lower L-shaped parts 241, 242, 243, 244 (hereinafter referred to as second connection parts 241, 242, 243, 244) corresponding to the rear end part 22 of the gear housing 21. The second connection parts 241, 242, 243, 244 are located directly behind the first connection parts 221, 222, 223, 224, respectively. Further, the first connection parts 221, 223 of the gear housing 21 and the second connection parts 241, 243 of the motor housing 23 are located above the plane P1, and the first connection parts 222, 224 of the gear housing 21 and the second connection parts 242, 244 of the motor housing 23 are located below the plane P1.

As shown in FIGS. 5 and 10, rear end parts of the left lower and right lower second connection parts 242, 244 are notched toward the plane P2. The holder receiving parts 63L, 63R are respectively formed in the notched parts. A recess is formed in a rear end part of each of the left upper and right upper second connection parts 241, 243 such that a front end of a bellows member 91 (described below) is fitted therein.

As illustrated by the second connection part 242 in FIG. 5, each of the second connection parts 241, 242, 243, 244 has a hole 62 at least having an open front end and extending in the front-rear direction. The hole 62 is a screw hole. The holes 62 of the second connection parts 241, 242, 243, 244 communicate with the holes 61 of the first connection parts 221, 222, 223, 224 in the front-rear direction, respectively. A screw 95 is inserted into each of the holes 61 from the front (the gear housing 21 side) and screwed into the hole 62. In this manner, the gear housing 21 and the motor housing 23 are fixedly connected together in the front-rear direction.

As shown in FIG. 5, the holes 62 at least formed in the second connection parts 242, 244 extend therethrough in the front-rear direction. In the second connection parts 242, 244, a rear end 952 of the screw 95 is located forward of a rear end (an opening 622) of the hole 62. Each of first locking parts 41 of spring holders 4L, 4R (described below) is inserted into a region from the opening 622 to the rear end 952 of the screw 95 in the hole 62 of each of the second connection parts 242, 244. These regions serve as second locking parts 621 for locking the spring holders 4L, 4R.

Figure 11:
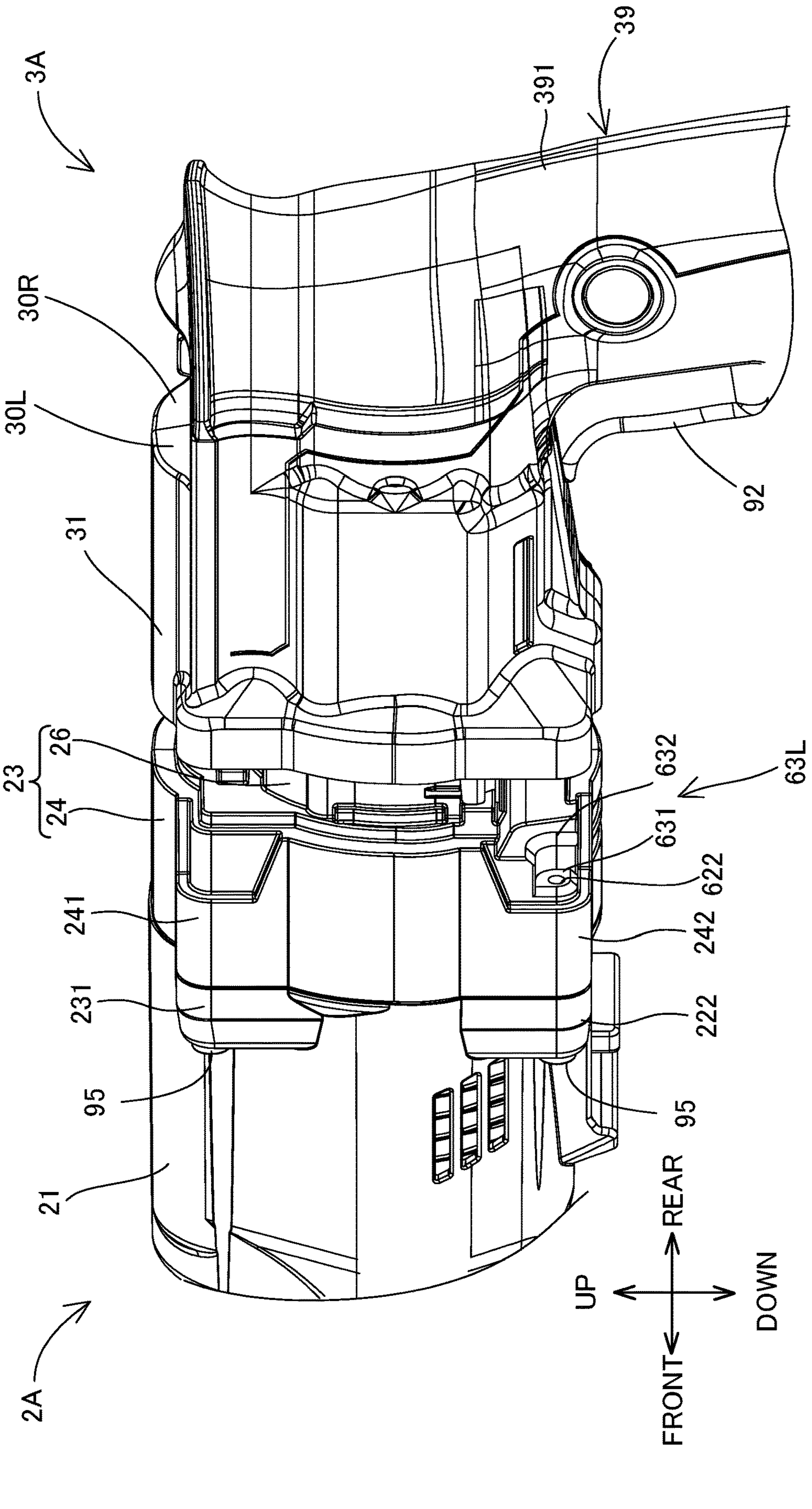
FIG. 11 shows the state in which a handle is assembled to a tool body.
Figure 12:
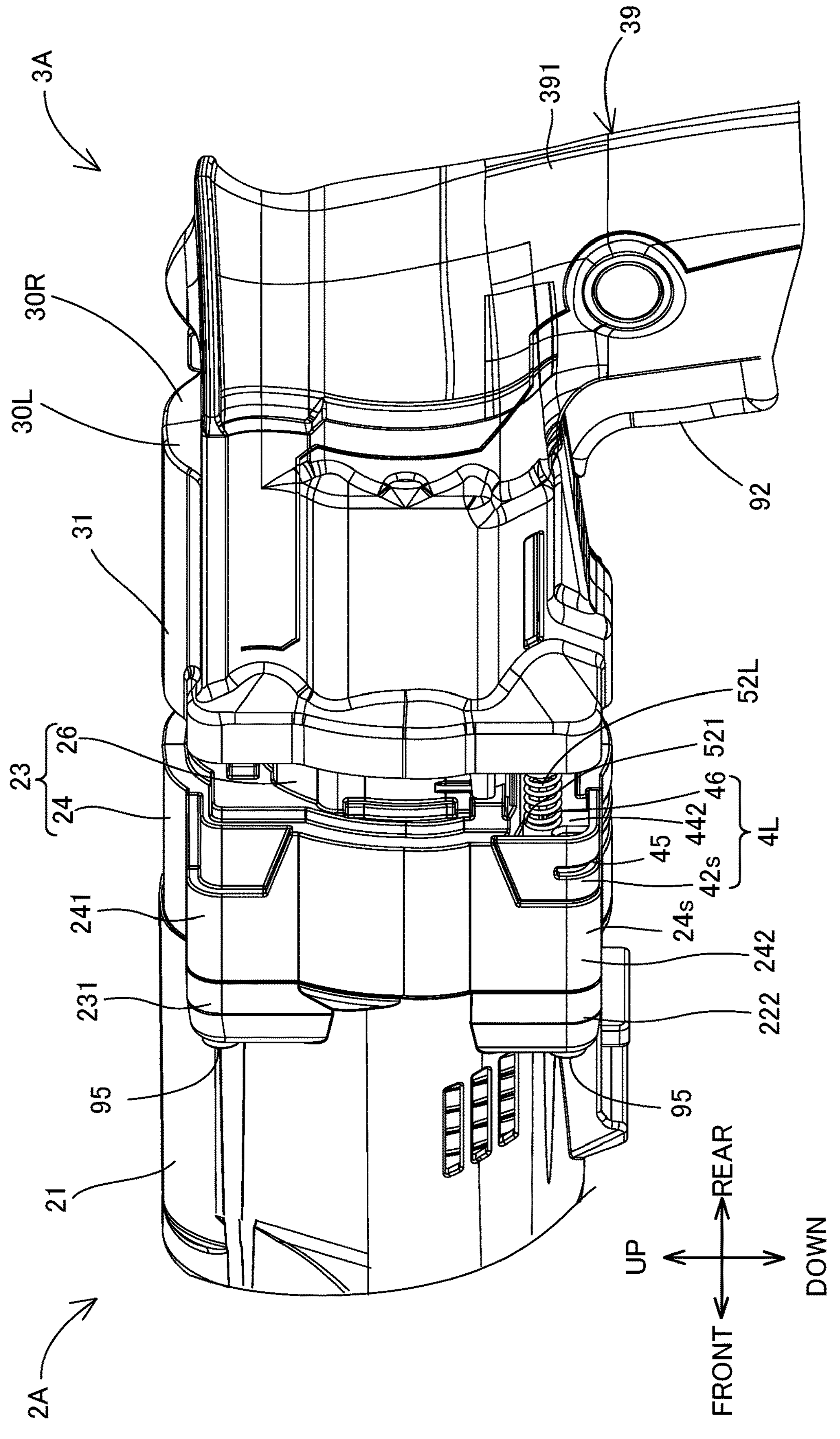
FIG. 12 shows the state in which the second biasing spring is arranged between the tool body and the handle.

As shown in FIG. 3, the holder receiving parts 63L, 63R are arranged below the plane P1 in the front part 24. The holder receiving parts 63L and 63R are arranged symmetrically to the plane P2 and apart from each other in the left-right direction. In this embodiment, the holder receiving parts 63L, 63R are defined by the notched parts of the second connection parts 242, 244 and the second locking parts 621. The right holder receiving part 63R is shown in FIG. 10, and the left holder receiving part 63L is shown in FIG. 11. Each of the holder receiving parts 63L, 63R includes a first surface 631 orthogonal to the front-rear direction and a second surface 632 that is formed apart rearward from the first surface 631 and surrounding the first surface 631. The above-described rear opening 622 is formed in the first surface 631. The holder receiving parts 63L, 63R are configured to hold the second biasing springs 52L, 52R via the spring holders 4L, 4R (described below).

The structure of the handle 3A and the structures of elements disposed therein are now described.

The handle 3A is formed by fixedly connecting a left part (left shell, left handle part) 30L and a right part (right shell, right handle part) 30R together in the left-right direction with screws. As shown in FIGS. 1 and 2, the handle 3A includes a cover part 31 and the grip part 39.

The cover part 31 forms an upper part of the handle 3A. The cover part 31 is arranged to partially surround the motor housing 23. In this embodiment, the cover part 31 covers the rear part 26 except the front end part and extends rearward of the rear part 26.

As shown in FIG. 3, the cover part 31 has a plurality of guide receiving parts 34. The guide receiving parts 34 are arranged in upper and lower parts of an inner surface of the cover part 31 on the left and right sides of the plane P2. The guide receiving parts 34 are respectively arranged to face the guide parts 28 provided in the rear part 26, and configured to be engaged with the guide parts 28 (the guide plates 29). In this embodiment, each of the guide receiving parts 34 is configured to be recessed in an L-shape in a direction away from the plane P2 in the inner surface of the cover part 31 and extend in the front-rear direction. The guide parts 28 and the guide receiving parts 34 guide the handle 3A and the tool body 2A to move relative to each other in the front-rear direction by sliding relative to each other in response to vibration caused during machining operation.

The cover part 31 further has a first spring holding part 33 and second spring holding parts 35, which will be described in detail later below.

An opening 311 is formed in an upper part of the cover part 31. Part of the opening 311 is arranged on the plane P2. The opening 311 is formed by notching an upper wall of the left part 30L and an upper wall of the right part 30R in a direction away from the plane P2. A lever 96 protrudes upward from the opening 311. The lever 96 is connected to a brush unit of the motor 71 and configured to change the rotating direction of the motor 71.

A bellows member 91 is arranged between the front part 24 of the motor housing 23 and the cover part 31 of the handle 3A. The bellows member 91 is an annular member arranged to surround the front end part of the rear part 26. The bellows member 91 is formed to be expandable (and contractable) in the front-rear direction. This prevents entry of dust between the motor housing 23 and the handle 3A.

The grip part 39 is configured to be held by a user. The grip part 39 extends downward from the cover part 31 in the up-down direction. More specifically, the upper end (base end) 391 of the grip part 39 is connected to a rear end part of the cover part 31, and the lower end (protruding end) 392 of the grip part 39 is configured as a free end. Thus, the grip part 39 is supported in a cantilever manner by the cover part 31. It can also be said that the grip part 39 is arranged to be offset downward relative to the driving axis A1 (the plane P1). In this embodiment, the grip part 39 is arranged below the motor 71.

As shown in FIG. 2, the trigger 92 is arranged in the upper end part of the grip part 39. A switch 93 is arranged behind the trigger 92 within the grip part 39. The switch 93 is normally kept off, and turned on when the trigger 92 is depressed. When the switch 93 is turned on, the motor 71 is energized. A power cord 94 is provided to be connectable to an external AC power supply and extends from the lower end 392 of the grip part 39 (the free end or protruding end of the handle 3A). As for the arrangement of the grip part 39 in the rotary hammer 1A, it can also be said that the grip part 39 is arranged below the driving axis A1 or below the plane P1. Further, it can also be said that the grip part 39 is arranged below the rotational axis A2 or below the motor 71.

The structure of connecting the tool body 2A and the handle 3A is now described in detail. The tool body 2A and the handle 3A are biased in directions away from each other in the front-rear direction by the biasing members (the first biasing spring 51 and the second biasing springs 52L, 52R). In this embodiment, the rotary hammer 1A is configured such that a biasing force on the lower side below the driving axis A1 (below the plane P1, close to the grip part 39) is larger than a biasing force on the upper side above the driving axis A1 (above the plane P1, far from the grip part 39).

As shown in FIGS. 2 to 4, the first biasing spring 51 elastically connects the tool body 2A and the handle 3A on the upper side above the driving axis A1 (above the plane P1). In this embodiment, the first biasing spring 51 is arranged on the plane P2. As shown in FIGS. 3 to 5, the second biasing springs 52L, 52R elastically connect the tool body 2A and the handle 3A on the lower side below the driving axis A1 (below the plane P1). The second biasing springs 52L, 52R are arranged on the left and right sides of the plane P2, respectively. The second biasing springs 52L and 52R are arranged symmetrically to the plane P2. In this embodiment, the first biasing spring 51 and the second biasing springs 52L, 52R all have the same specifications. The springs having the same specifications refer to springs formed of the same material in the same shape. Thus, the first biasing spring 51 and the second biasing springs 52L, 52R have the same spring constant. In this embodiment, compression coil springs are adopted as the first biasing spring 51 and the second biasing springs 52L, 52R.

As shown in FIGS. 3 and 4, the first biasing spring 51 is arranged between the first spring holding part 27 provided in the tool body 2A and the first spring holding part 33 provided in the handle 3A.

In this embodiment, the first spring holding part 27 is fixed to an outer surface (an upper wall 263; see FIG. 3) of the rear part 26 of the motor housing 23. The first spring holding part 27 has an abutment surface 271 orthogonal to the front-rear direction and a holding wall 272 formed around the abutment surface 271. The holding wall 272 is open to the right. The first spring holding part 27 (the abutment surface 271) is arranged on the plane P2. The abutment surface 271 receives (abuts on) a front end 511 of the first biasing spring 51.

The first spring holding part 33 is fixed to an inner surface of the left part 30L of the cover part 31. The first spring holding part 33 has an abutment surface 331 orthogonal to the front-rear direction and a holding wall 332 open to the right and formed around the abutment surface 331. Part of the first spring holding part 33 (the abutment surface 331) is arranged on the plane P2 and behind (directly behind) the abutment surface 271 of the first spring holding part 27 of the motor housing 23. The abutment surface 331 receives (abuts on) a rear end 512 of the first biasing spring 51.

The second biasing springs 52L, 52R are respectively arranged between the spring holders 4L, 4R mounted to the holder receiving parts 63L, 63R of the tool body 2A and the second spring holding parts 35 provided in the handle 3A. The spring holders 4L, 4R (left and right spring holders) are configured to hold front ends 521 of the second biasing springs 52L, 52R (left and right springs). The second spring holding parts 35 are configured to hold rear ends 522 of the second biasing springs 52L, 52R.

The second biasing spring 52L and elements (the holder receiving part 63L, the spring holder 4L, the second spring holding part 35) for holding the second biasing spring 52L are arranged symmetrically to the second biasing spring 52R and elements (the holder receiving part 63R, the spring holder 4R, the second spring holding part 35) for holding the second biasing spring 52R with respect to the plane P2.

The second spring holding parts 35 are respectively fixed to inner walls of the left and right parts 30L, 30R in a front end part of the cover part 31. The second spring holding parts 35 are respectively provided corresponding to the holder receiving parts 63L, 63R of the motor housing 23. The second biasing spring 52L and the left elements for holding the second biasing spring 52L respectively have the same structures as the second biasing spring 52R and the right elements for holding the second biasing spring 52R as described above, and therefore, in the following description, the second biasing spring 52L, the holder receiving part 63L, the spring holder 4L and the second spring holding part 35 (the left elements) on the left side are mainly described by way of example.

In FIG. 4, the second spring holding part 35 provided in the left part 30L is shown. The second spring holding part 35 has an abutment surface 351 orthogonal to the front-rear direction and a holding wall 352 formed around the abutment surface 351. The abutment surface 351 of the second spring holding part 35 receives (abuts on) a rear end 522 of the second biasing spring 52L. As shown in FIG. 4, the abutment surface 351 for receiving the rear end 522 of the second biasing spring 52L is arranged forward of the abutment surface 331 for receiving the rear end 512 of the first biasing spring 51, and the second biasing springs 52L, 52R are arranged forward of the first biasing spring 51.

Figure 7:
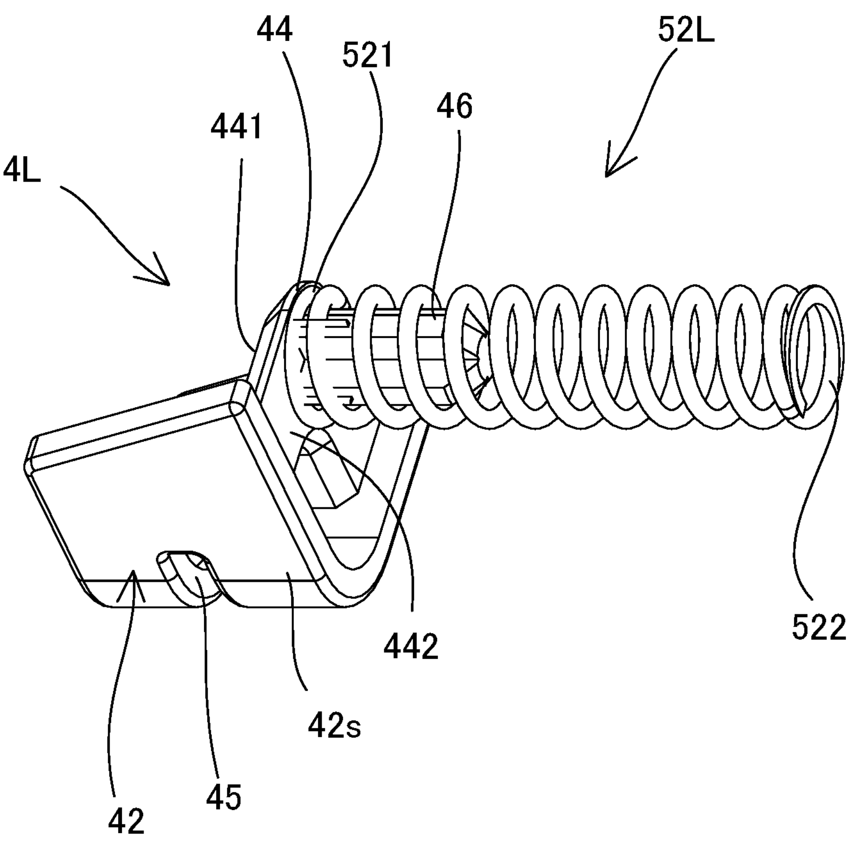
FIG. 7 shows the state in which the second biasing spring is held by the spring holder.
Figure 8:
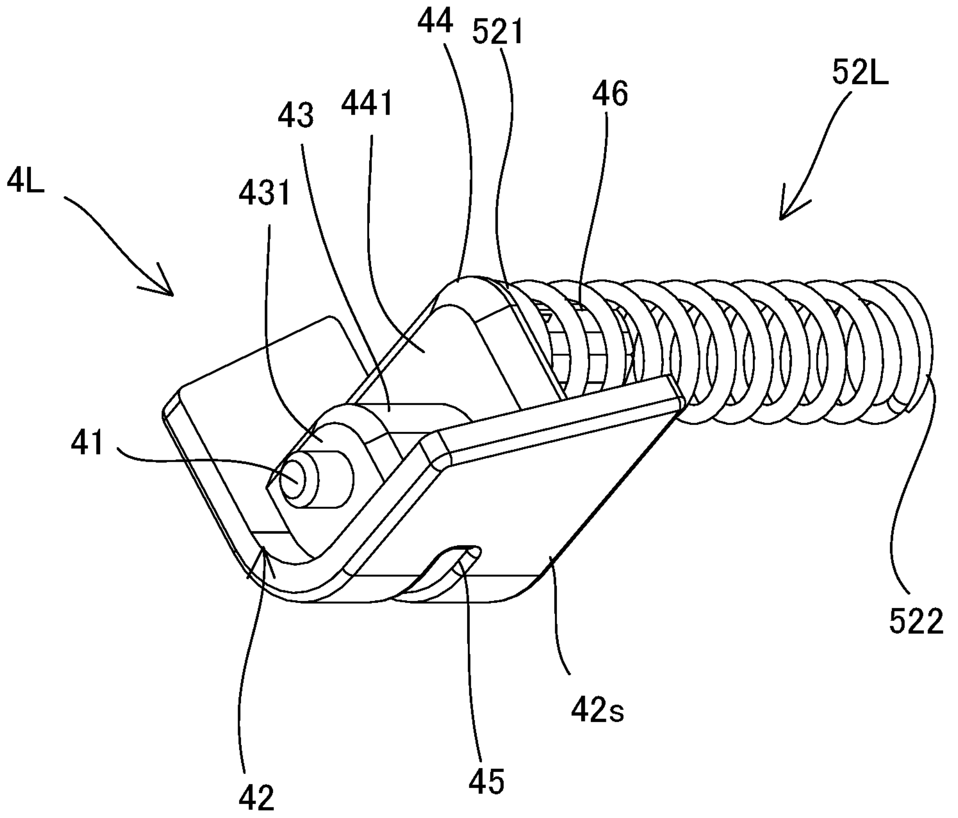
FIG. 8 is a view for illustrating a first locking part of the spring holder, while showing the state in which the second biasing spring is held by the spring holder.

The spring holders 4L, 4R are configured to be connected to the tool body 2A via the holder receiving parts 63L, 63R of the tool body 2A. As shown in FIG. 3, the spring holders 4L, 4R are configured to be locked (fitted) to the rear end part (the notched parts of the second connection parts 242, 244) of the front part 24. In FIGS. 7 and 8, the spring holder 4L and the second biasing spring 52L are shown. The spring holder 4L has an outer wall 42, a support part 43 and a rear wall 44 that are fixed to the inside of the outer wall 42, a first locking part 41, a protruding part 46, and an engagement part 45.

The outer wall 42 has a generally L-shaped section. The outer wall 42 has an outer surface 42*s* that is exposed to the outside of the rotary hammer 1A in the state (hereinafter referred to as the mounted state) where the spring holder 4L is mounted to the holder receiving part 63L. As shown in FIG. 1, in the mounted state, the outer surface 42*s* of the spring holder 4L is continuous to an outer surface 24*s* of the motor housing 23 (the front part 24).

As shown in FIG. 8, the support part 43 is a block-like part fixed to a corner part of an inner surface of the outer wall 42. The support part 43 has a first surface 431 that extends orthogonally to the front-rear direction and defines a front end of the support part 43 in the mounted state. The first surface 431 is configured to abut on the first surface 631 (see FIG. 11) of the holder receiving part 63L. The rear wall 44 is connected to a rear end of the support part 43 and formed perpendicularly to the front-rear direction. The rear wall 44 has a front surface 441 and a rear surface 442 that come on the front side and rear side in the mounted state, respectively. As shown in FIG. 4, the front surface 441 is configured to abut on the second surface 632 of the holder receiving part 63L in the mounted state.

The first locking part 41 is a protruding (columnar) part protruding forward from the first surface 431. As shown in FIG. 5, the first locking part 41 is configured to be inserted into the hole 62 (the second locking part 621) from the opening 622 of the holder receiving part 63L. In the mounted state, the first locking part 41 is inserted into the second locking part 621, and the first surface 431 and the front surface 441 of the spring holder 4L abut on the first and second surfaces 631, 632 of the holder receiving part 63L, respectively.

The protruding part 46 is a part protruding rearward from the rear surface 442. As shown by an arrow in FIG. 6, a front end part of the second biasing spring 52L is fitted (more specifically, lightly press-fitted) onto the protruding part 46. When the second biasing spring 52L is fitted onto the protruding part 46 and the spring holder 4L is mounted to the holder receiving part 63L, the front end 521 of the second biasing spring 52L abuts on the rear surface 442, and the rear end 522 of the second biasing spring 52L abuts on the abutment surface 351 (see FIGS. 4 and 5).

The engagement part 45 is configured to be engaged with a removing tool for removing the spring holder 4L from the tool body 2A. In this embodiment, the engagement part 45 is a recessed part of the outer surface 42*s* of the spring holder 4L and is exposed on the outside of the spring holder 4L in the mounted state. The engagement part 45 is generally L-shaped to conform to the shape of the outer wall 42. The removing tool may be a tool such as a flat-tip screwdriver having a tip that can be engaged with the engagement part 45. A user can remove the spring holder 4L from the holder receiving part 63L by engaging the removing tool with the engagement part 45 and moving the spring holder 4L rearward so as to separate the spring holder 4L (the first locking part 41) from the holder receiving part 63L (the second locking part 621). Therefore, the rotary hammer 1A of this embodiment facilitates maintenance such as replacement of the second biasing springs 52L, 52R.

With the above-described connecting structure, as shown in FIG. 4, the first biasing spring 51 is disposed in a compressed state between the abutment surface 271 of the first spring holding part 27 of the motor housing 23 and the abutment surface 331 of the first spring holding part 33 of the cover part 31. Thus, the first biasing spring 51 biases the tool body 2A and the handle 3A in directions away from each other in the front-rear direction on the upper side above the driving axis A1 (above the plane P1, far from the grip part 39).

As shown in FIG. 5, the second biasing spring 52L is disposed in a compressed state between the rear surface 442 of the spring holder 4L mounted to the holder receiving part 63L of the motor housing 23 and the abutment surface 351 of the second spring holding part 35 of the cover part 31 (the left part 30L). Thus, the second biasing spring 52L biases the tool body 2A and the handle 3A in directions away from each other in the front-rear direction on the lower side below the driving axis A1 (below the plane P1, close to the grip part 39) and on the left side of the plane P2. Similarly, the second biasing spring 52R is disposed in a compressed state between the rear surface 442 of the spring holder 4R mounted to the holder receiving part 63R of the motor housing 23 and the abutment surface 351 of the second spring holding part 35 of the cover part 31 (the right part 30R). Thus, the second biasing spring 52R biases the tool body 2A and the handle 3A in directions away from each other in the front-rear direction on the lower side below the driving axis A1 (below the plane P1, close to the grip part 39) and on the right side of the plane P2. Thus, in the rotary hammer 1A, the front ends 521 of the second biasing springs 52L, 52R are held by the tool body 2A via the spring holders 4L, 4R, and the rear ends 522 of the second biasing springs 52L, 52R are directly held by the left and right parts 30L, 30R of the handle 3A.

Further, in this embodiment, the first biasing spring 51 and the second biasing springs 52L, 52R are arranged between the tool body 2A and the handle 3A with the same initial load applied thereto.

The above-described rotary hammer 1A can be manufactured, for example, as follows.

(i) Prepare the tool body 2A.

(ii) Assemble one of the left and right parts 30L, 30R to the tool body 2A. Specifically, assemble one of the left and right parts 30L, 30R such that a part corresponding to the cover part 31 of the handle 3A in the one part 30L or 30R covers part of the motor housing 23.

Figure 9:
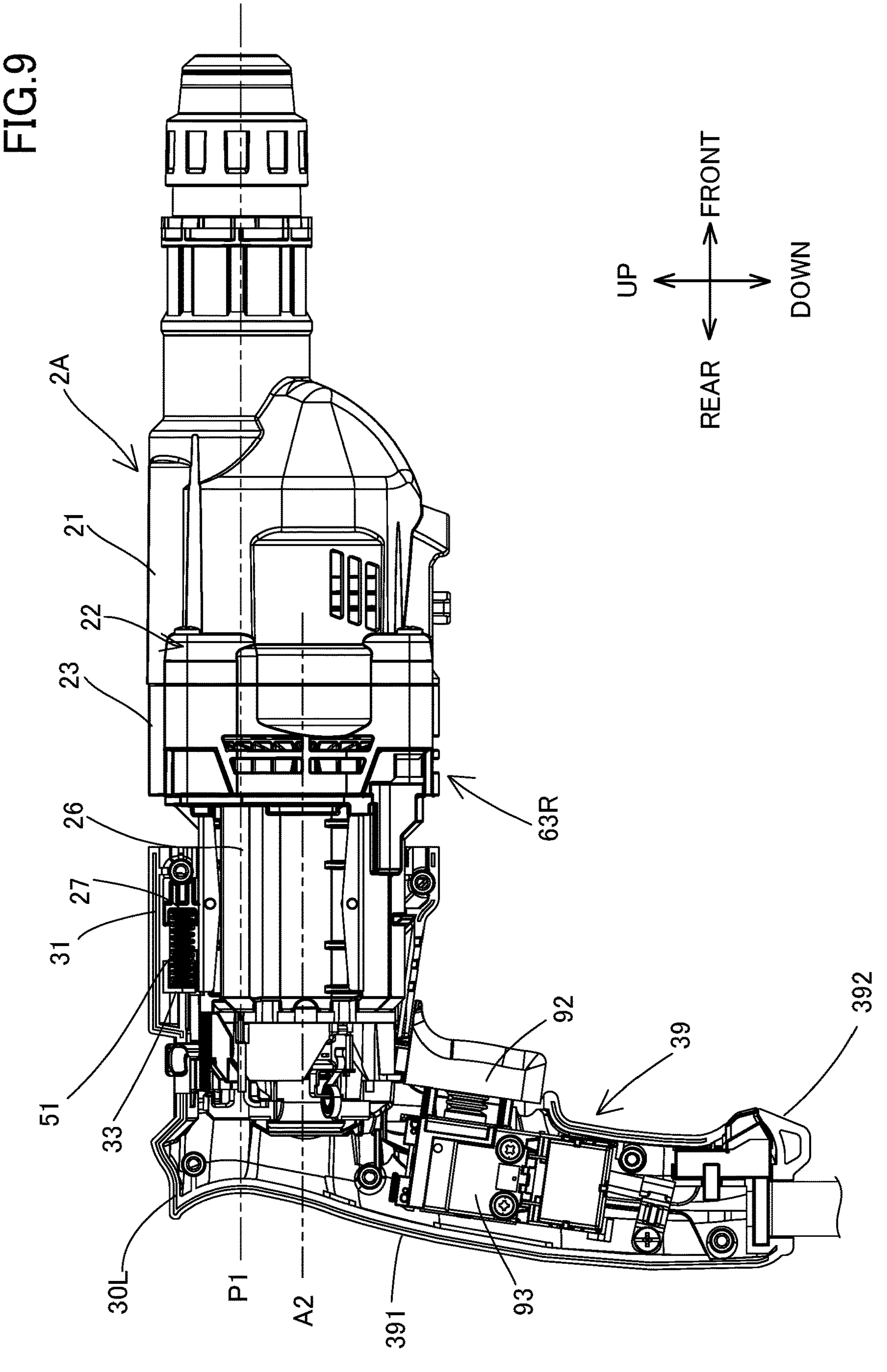
FIG. 9 shows the state in which a left part is assembled to a motor housing.

In this embodiment, as shown in FIGS. 9 and 10, the left part 30L is arranged such that a part corresponding to the cover part 31 in the left part 30L covers a left outside part of the rear part 26. Further, in this embodiment, the left part 30L is arranged such that the lever 96 is disposed in a part corresponding to the opening 311 in the left part 30L. At this time, the tool body 2A and the left part 30L are placed on a desk or the like such that an outer surface of the left part 30L is in contact with the desk or the like (i.e. an inner surface of the left part 30L faces vertically upward), and parts of the handle 3A (such as the switch 93, the trigger 92 and wirings) are assembled to the left part 30L. Further, the first biasing spring 51 is arranged between the first spring holding part 33 of the left part 30L and the first spring holding part 27 of the motor housing 23. More specifically, the front and rear ends 511, 512 of the first biasing spring 51 are abutted on the abutment surface 331 of the first spring holding part 33 and the abutment surface 271 of the first spring holding part 27, respectively.

(iii) Subsequently, assemble the other of the left and right parts 30L, 30R to an intermediate product manufactured in step (ii) above.

In this embodiment, an inner surface of the right part 30R is faced vertically downward and the right and left parts 30R, 30L are abutted on each other in the left-right direction and connected together in the left-right direction by screws. As shown in FIG. 11, the rear part 26 of the motor housing 23 except the front end is sandwiched between the left and right parts 30L, 30R by completion of steps (i) to (iii).

(iv) Place the second biasing spring 52L between the tool body 2A and the left part 30L.

For example, as shown in FIGS. 7 and 8, the front end part of the second biasing spring 52L is fitted onto the protruding part 46 of the spring holder 4L. More specifically, the front end part of the second biasing spring 52L is lightly press-fitted onto the protruding part 46 such that the front end 521 of the second biasing spring 52L abuts on the rear surface 442 of the spring holder 4L. In this manner, the second biasing spring 52L is held by the spring holder 4L. Subsequently, the rear end 522 of the second biasing spring 52L held by the spring holder 4L is abutted on the abutment surface 351 of the second spring holding part 35 of the left part 30L. At this time, the spring holder 4L is placed in the holder receiving part 63L while the second biasing spring 52L is compressed by being pressed against the abutment surface 351. More specifically, the second biasing spring 52L is compressed and the first locking part 41 of the spring holder 4L is placed directly behind the second locking part 621 of the holder receiving part 63L. In this state, when the second biasing spring 52L is released, the first locking part 41 is locked to the second locking part 621 and the spring holder 4L is placed in the holder receiving part 63L (see FIGS. 5 and 12).

(v) Place the second biasing spring 52R between the tool body 2A and the right part 30R.

Like in step (iv) above, the front end part of the second biasing spring 52R is fitted onto the protruding part 46 of the spring holder 4R. Subsequently, the rear end 522 of the second biasing spring 52R held by the spring holder 4R is abutted on the abutment surface 351 of the second spring holding part 35 of the right part 30R. At this time, the spring holder 4R is placed in the holder receiving part 63R while the second biasing spring 52R is compressed by being pressed against the abutment surface 351. More specifically, the second biasing spring 52R is compressed and the first locking part 41 of the spring holder 4R is placed directly behind the second locking part 621 of the holder receiving part 63R. In this state, when the second biasing spring 52R is released, the first locking part 41 is locked to the second locking part 621 and the spring holder 4R is placed in the holder receiving part 63R. Steps (iv) and (v) may be performed in the reverse order.

In this manner, the rotary hammer 1A is manufactured by elastically connecting the tool body 2A and the handle 3A on the upper side above the driving axis A1 (above the plane P1) by the first biasing spring 51 and elastically connecting the tool body 2A and the left and right parts 30R on the lower side below the driving axis A1 (below the plane P1) by the second biasing springs 52L, 52R.

In step (i) above, the bellows member 91 may be mounted to the tool body 2A so as to surround the front end part of the rear part 26. In this embodiment, the bellows member 91 is formed of rubber and configured to be radially expandable as well. Thus, the bellows member 91 can be radially expanded so that a space for performing steps (iv) and (v) is ensured.

When manufacturing the rotary hammer 1A, where the handle 3A is configured to be divided into the left part 30L and the right part 30R and the biasing springs are respectively arranged (disposed) between the tool body 2A and the left part 30L and between the tool body 2A and the right part 30R, it may take a relatively long time for a worker in the process of placing the biasing springs. This is because the inner surface of one of the left and right parts 30L, 30R is faced vertically downward when the left and right parts 30L, 30R are connected in the left-right direction. In this embodiment, the inner surface of the right part 30R is faced vertically downward, so that the second biasing spring 52R held temporarily by the right part 30R (the second spring holding part 35) may drop or be displaced out of the second spring holding part 35, depending on the skill of the worker. The inner surface of the right part 30R is faced vertically downward because, as described above, the intermediate product of the rotary hammer 1A is placed on a desk or the like with the inner surface of the left part 30L faced vertically upward in order to assemble parts (such as the switch 93 and the trigger 92) of the handle 3A to the left part 30L arranged behind the tool body 2A.

It is preferable from the viewpoints of durability that the biasing members (the first biasing spring 51, the second biasing springs 52L, 52R) are not exposed on the outer surface of the rotary hammer 1A. Accordingly, the spring holding parts are typically arranged inside the rotary hammer (inside the tool body 2A, inside the handle 3A). Therefore, it may possibly take a relatively long time to fixedly connect the left and right parts 30L, 30R in the left-right direction so as to cover a rear part of the tool body 2A, and subsequently arrange the biasing members between the tool body 2A and the handle 3A.

In this embodiment, however, as described in (i) to (v) above, the second biasing springs 52L, 52R can be easily arranged respectively between the tool body 2A and the left part 30L of the handle 3A and between the tool body 2A and the right part 30R of the handle 3A by using the spring holders 4L, 4R. Thus, the rotary hammer 1A can be easily manufactured.

Further, the outer surfaces 42*s* of the spring holders 4L, 4R are continuous to the outer surface 24*s* of the tool body 2A in the mounted state, so that the rotary hammer 1A is improved in design. Furthermore, the spring holders 4L, 4R are easily aligned with the holder receiving parts 63L, 63R.

Further, the spring holders 4L, 4R (the first locking part 41) are locked to the motor housing 23 by utilizing the rear part (the second locking part 621) of the hole 62 into which the screw 95 for connecting the gear housing 21 and the motor housing 23 is inserted. Thus, the structure for locking the spring holders 4L, 4R to the tool body 2A are simplified.

The rotary hammer 1A of this embodiment further has the following advantages.

In the rotary hammer 1A having the tool body 2A and the handle 3A that are elastically connected together, the grip part 39 is pressed toward a workpiece during machining operation. In the rotary hammer 1A in which the grip part 39 is offset downward relative to the driving axis A1 and the lower end 392 of the grip part 39 (the handle 3A) is a free end, the handle 3A (the rotary hammer 1A) easily tilts in a direction in which the lower end 392 of the handle 3A moves toward the workpiece when a user presses the grip part 39 against the workpiece during machining operation. In the rotary hammer 1A of this embodiment, the two biasing members (the second biasing springs 52L, 52R) are arranged on the side close to the grip part 39, and the one biasing member (the biasing spring 51) is arranged on the side far from the grip part 39. Thus, a biasing force on the side close to the grip part 39 is larger than a biasing force on the side far from the grip part 39. This suppresses tilting of the rotary hammer 1A in a direction in which the lower end 392 of the handle 3A moves toward the workpiece, during machining operation. Therefore, the attitude of the rotary hammer 1A during machining operation is stabilized. In other words, a user can stably perform the machining operation.

Provision of the first biasing spring 51 and the second biasing springs 52L, 52R with the same specifications reduces the cost for stabilizing machining operation, and further prevents erroneous assembling compared with a structure using springs with different specifications as the first biasing spring 51 and the second biasing springs 52L, 52R.

Further, the second biasing springs 52L, 52R are arranged forward of the first biasing spring 51. Therefore, as compared with a structure in which the second biasing springs 52L, 52R are arranged rearward of the first biasing spring 51, the grip part 39 is arranged apart from the second biasing springs 52L, 52R in the front-rear direction, so that the trigger 92 can be arranged in a position close to the driving axis A1 (in the vicinity of the upper end 391 of the grip part 39) in the grip part 39. This realizes stabilization of machining operation and size reduction of the rotary hammer 1A.

Further, in the rotary hammer 1A, the first biasing spring 51 is arranged substantially in the center in the left-right direction (on the plane P2), and the second biasing springs 52L, 52R are arranged symmetrically to the plane P2. Thus, the biasing forces acting between the tool body 2A and the handle 3A are equalized in the left-right direction, so that the machining operation can be stably performed.

Provision of the cover part 31 covering the rear part 26 of the motor housing 23 further suppresses tilting of the handle 3A (the rotary hammer 1A) during machining operation. In the rotary hammer 1A during machining operation, vibration is mainly caused in the driving axis direction (the front-rear direction) by a force of the driving mechanism 75 driving the tool accessory 101 and a reaction force from a workpiece against the hammering force of the tool accessory 101. In this embodiment, the handle 3A is smoothly slid in the front-rear direction relative to the tool body 2A by provision of the guide receiving parts 34 of the handle 3A and the guide parts 28 of the motor housing 23.

Other embodiments for making the biasing force on the side close to the grip part 39 larger than the biasing force on the side far from the grip part 39 are now described. Components or structures which are substantially identical to those of the above-described first embodiment are given the same numerals as in the first embodiment and are not described.

Second Embodiment

Figure 13:
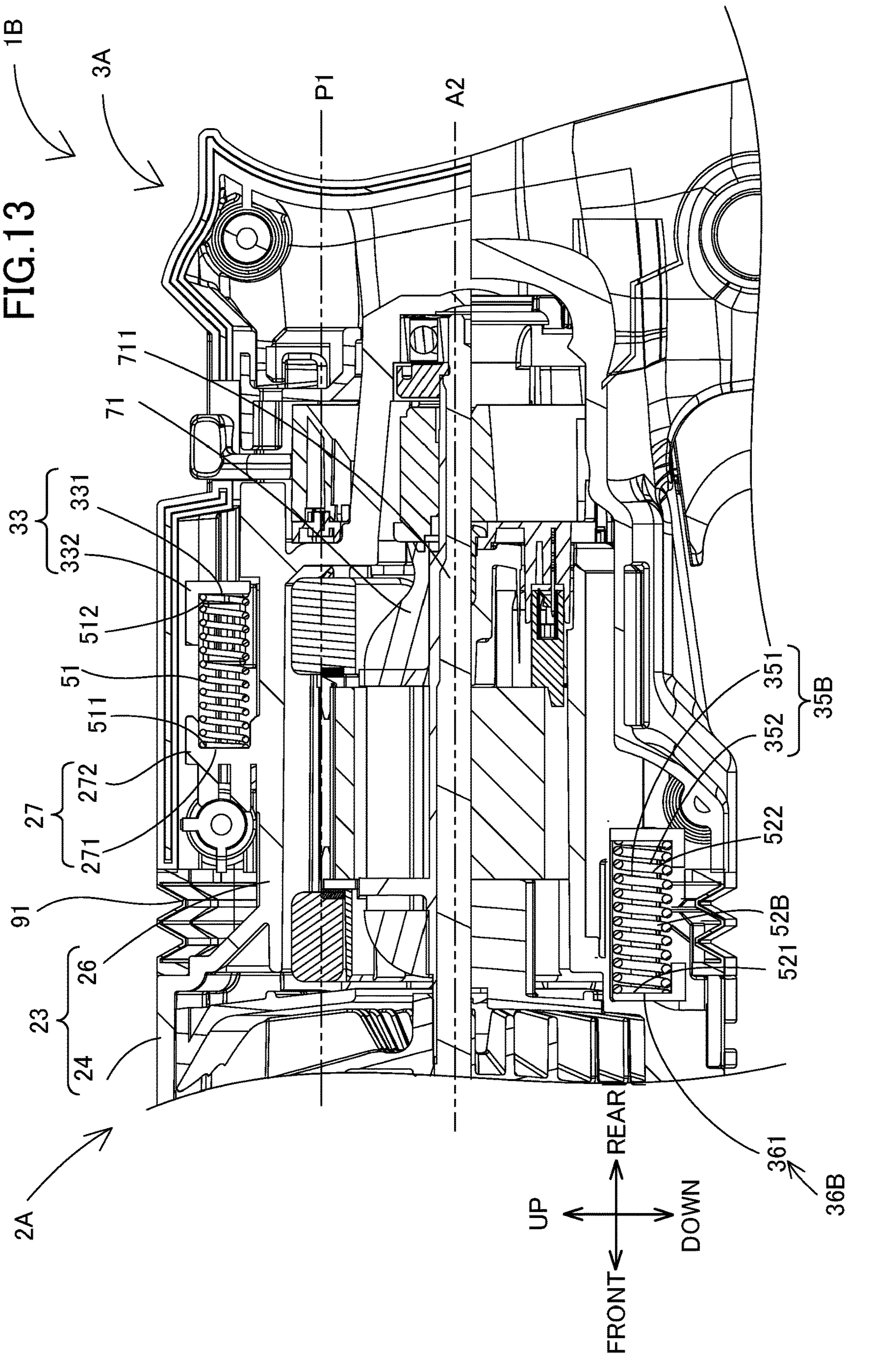
FIG. 13 is a partial, sectional view of a rotary hammer 1B of a second embodiment, taken along a plane P2 for illustrating the arrangement relation between the first and second biasing members.

FIG. 13 shows a rotary hammer 1B according to the second embodiment. In the rotary hammer 1B, one first biasing spring 51 is arranged above the driving axis A1, and one second biasing spring 52B is arranged below the driving axis A1. In this embodiment, the first biasing spring 51 and the second biasing spring 52B have different specifications. The second biasing spring 52B has a larger spring constant than the first biasing spring 51.

The rotary hammer 1B of this embodiment has a second spring holding part 36B for holding a front end 521 of the second biasing spring 52B and a second spring holding part 35B for holding a rear end 522 of the second biasing spring 52B, on the plane P2. The second spring holding part 36B is provided in a lower part of the motor housing 23, and the second spring holding part 35B is provided on the inner surface of the cover part 31 behind the second spring holding part 36B. Like in the first embodiment, the initial loads on the first biasing spring 51 and the second biasing spring 52B are the same.

According to the second embodiment, the second biasing spring 52B has a larger spring constant than the first biasing spring 51, so that the biasing force on the side close to the grip part 39 can be larger than the biasing force on the side far from the grip part 39 while the same number of the springs are arranged above and below the driving axis A1. This suppresses tilting of the rotary hammer 1B during machining operation. Further, in the second embodiment, provision of the only one second biasing spring 52B advantageously eliminates the need for a space for arranging a plurality of second biasing springs on the side close to the grip part 39.

Third Embodiment

Figure 14:
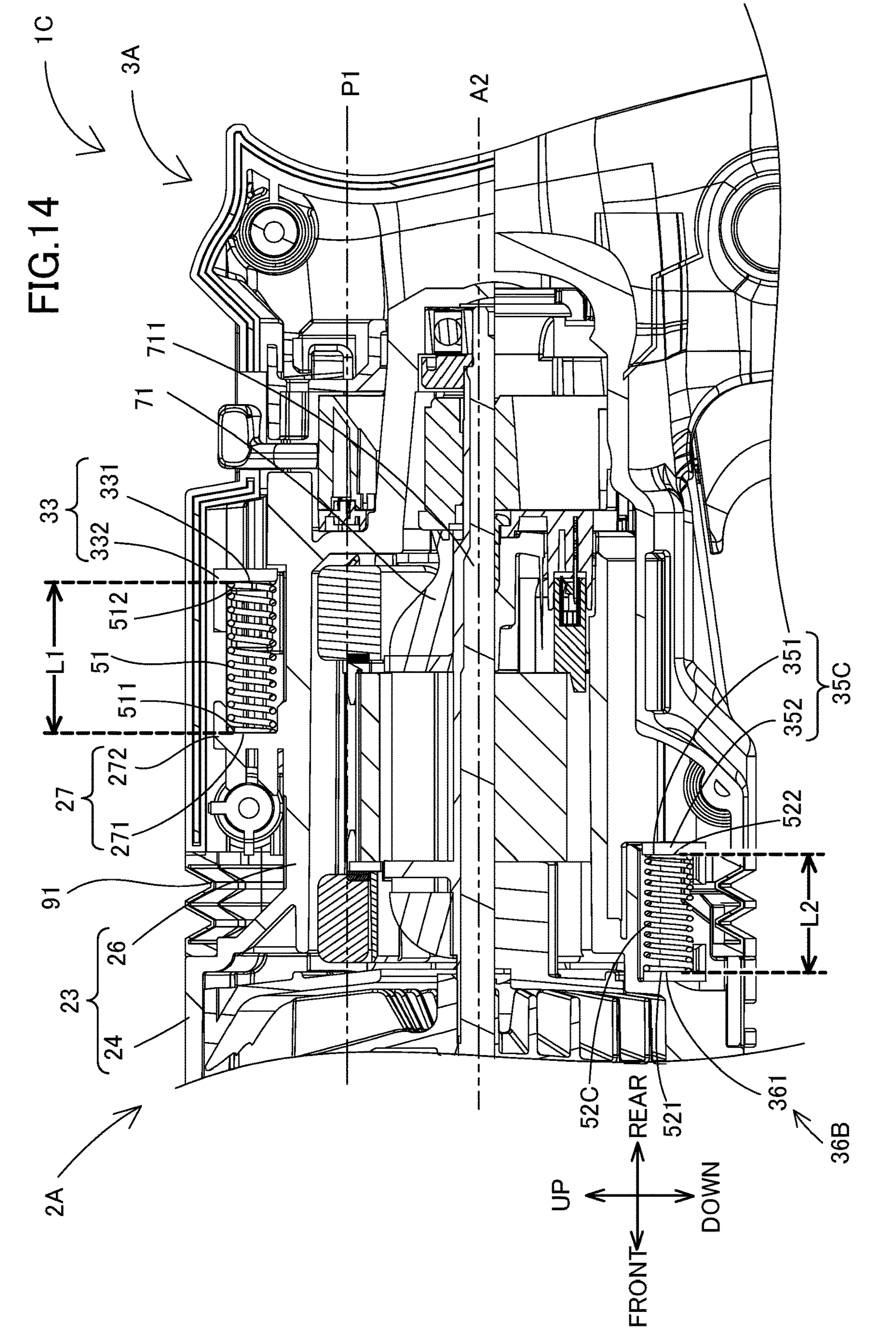
FIG. 14 is a partial, sectional view of a rotary hammer 1C of a third embodiment, taken along a plane P2 for illustrating the arrangement relation between the first and second biasing members.

FIG. 14 shows a rotary hammer 1C according to the third embodiment. In the rotary hammer 1C, one first biasing spring 51 is arranged above the driving axis A1, and one second biasing spring 52C is arranged below the driving axis A1. Like in the first embodiment, the first biasing spring 51 and the second biasing spring 52C have the same specifications.

Distance L1 shown in FIG. 14 is a distance between the first spring holding part 27 (the abutment surface 271) for receiving the front end 511 of the first biasing spring 51 and the first spring holding part 33 (the abutment surface 331) for receiving the rear end 512 of the first biasing spring 51. Distance L2 is a distance between the second spring holding part 36B (the abutment surface 361) for receiving the front end 521 of the second biasing spring 52C and the second spring holding part 35C (the abutment surface 351) for receiving the rear end 522 of the second biasing spring 52C. In this embodiment, the second spring holding part 35C is located forward of the position of the second spring holding parts 35, 35B of the above-described embodiments. Thus, the distance L2 is shorter than the distance L1. In other words, the second biasing spring 52C is assembled to the rotary hammer 1C with a larger initial load applied thereto than that applied to the first biasing spring 51.

According to the third embodiment, the initial load on the second biasing spring 52C is larger than the initial load on the first biasing spring 51, so that the biasing force on the side close to the grip part 39 can be larger than the biasing force on the side far from the grip part 39 while the same number of the springs having the same specifications are arranged above and below the driving axis A1. This suppresses tilting of the rotary hammer 1C during machining operation. Further, like the second embodiment, the third embodiment has an advantage that a space for arranging a plurality of second biasing springs on the side close to the grip part 39 is not needed. Furthermore, like in the first embodiment, provision of the springs with the same specifications reduces the cost for stabilizing machining operation, and further prevents erroneous assembling compared with a structure using springs with different specifications as the first biasing spring 51 and the second biasing spring 52C.

Correspondences between the features of the above-described embodiments and the features of the present disclosure are as follows. However, the features of the above-described embodiments are merely exemplary and do not limit the features of the present disclosure or invention.

The rotary hammers 1A, 1B, 1C are examples of the "power tool having a hammer mechanism". The first biasing spring 51 is an example of the "first biasing member". The second biasing springs 52L, 52R, 52B, 52C are examples of the "second biasing member".

Other Embodiments

The power tool having a hammer mechanism according to the present disclosure is not limited to the rotary hammers 1A, 1B, 1C of the above-described embodiments. For example, the following non-limiting modifications may be made. At least one of these modifications can be adopted in combination with at least one of the features of the rotary hammers 1A, 1B, 1C of the above-described embodiments and the claimed invention.

The numbers of the biasing springs are not limited to those of the above-described embodiments. For example, two or more first biasing springs may be provided above the driving axis A1, and three or more second biasing springs may be provided below the driving axis A1. Further, for example, like the second biasing springs 52L, 52R of the above-described embodiments, two first biasing springs 51 may be respectively arranged on the left and right sides of the plane P2. In this case, the front ends 511 of the first biasing springs 51 may be connected to the tool body 2A via the spring holders 4L, 4R, and the rear ends 522 of the first biasing springs 51 may be directly connected to the left and right parts 30L, 30R. According to this embodiment, like in the above-described embodiment, the rotary hammer can be easily manufactured.

The spring holders 4L, 4R may be connected not to the tool body 2A but to the handle 3A. For example, the second biasing spring 52L may be connected to the left part 30L via the spring holder 4L and directly connected to (held by) the tool body 2A. Similarly, the second biasing spring 52R may be connected to the right part 30R via the spring holder 4R and directly connected to (held by) the tool body 2A. Alternatively, the second biasing spring 52L may be connected to the left part 30L via the spring holder 4L and directly connected to the tool body 2A, and the second biasing spring 52R may be connected to the tool body 2A via the spring holder 4R and directly connected to the right part 30R. According to this embodiment, like in the above-described embodiments, the rotary hammer can be easily manufactured.

In order to suppress tilting of the rotary hammer 1A, 1B, 1C in a direction in which the handle 3A moves toward a workpiece during machining operation, it is preferable to adjust (1) the number, (2) initial load and (3) spring constant of each of at least one first biasing spring and at least one second biasing spring such that the biasing force of the first biasing spring arranged above the driving axis A1 is smaller than the biasing force of the second biasing spring arranged below the driving axis A1. Two or all of (1) to (3) above may be adjusted if the biasing force of the first biasing spring arranged above the driving axis A1 and the biasing force of the second biasing spring arranged below the driving axis A1 fail to reach respective target set values by adjusting any one of (1) to (3).

The biasing members that bias the tool body 2A and the handle 3A in directions away from each other in the front-rear direction are not limited to the first biasing spring 51 and the second biasing springs 52L, 52R, 52B, 52C. For example, springs of a different kind (such as a tension coil spring, a leaf spring and a torsion spring) from a compression coil spring may be adopted. Alternatively, an elastic member other than a spring, such as rubber and synthetic resin, may be adopted as the biasing members. The structures of the spring holders 4L, 4R, the holder receiving parts 63L, 63R, the first spring holding parts 27, 33 and the second spring holding parts 35B, 35C, 36B may be appropriately changed according to the kind and position of the biasing members to be used.

The rotary hammers 1A, 1B, 1C are described as examples of the power tool having a hammer mechanism in the above-described embodiments, but the features of the present disclosure may be applied to other power tools capable of performing hammering motion (such as an electric hammer not capable of performing rotation but capable of performing only hammering motion). Further, the rotary hammer 1A may have only two action modes, i.e. hammering mode and rotation mode. The structures and arrangement of the motor 71 and the driving mechanism 75 may be appropriately changed according to the power tool having a hammer mechanism to which the features of the present disclosure are applied. For example, a DC motor (such as a brushless DC motor) may be adopted as the motor 71. In this case, for example, a battery mounting part for removably mounting a rechargeable battery (battery pack) may be provided on the tool body 2A or the handle 3A.

In view of the nature of the present disclosure and the above-described embodiments, the following aspects are provided. At least one of the aspects can be adopted in combination with at least one of the features of the above-described embodiments and modifications and the claimed invention.

(Aspect 1-1) A rotational axis of the motor extends in parallel to the driving axis below the driving axis, and the grip part is arranged below the rotational axis.

(Aspect 1-2) A rotational axis of the motor extends in parallel to the driving axis below the driving axis, and the grip part is arranged below the motor.

(Aspect 1-3) The cover part at least partially surrounds the motor housing in a circumferential direction around the rotational axis.

(Aspect 1-4) The motor housing has a plurality of guide parts configured to guide the handle to move relative to the tool body along the driving axis, and the cover part has a plurality of guide receiving parts arranged in positions corresponding to the guide parts.

(Aspect 1-5) The guide parts include a left guide part provided on the left side of the imaginary plane and a right guide part provided on the right side of the imaginary plane, and the guide receiving parts include a left guide receiving part provided on the left side of the imaginary plane and a right guide receiving part provided on the right side of the imaginary plane.

(Aspect 1-6) The handle has a left part and a right part that are connected together in a left-right direction orthogonal to the front-rear direction and the up-down direction, the at least one second biasing member includes a left spring and a right spring, the left spring is arranged between the left part and the tool body, and the right spring is arranged between the right part and the tool body.

(Aspect 1-7) The power tool having a hammer mechanism further has a left spring holder connected to one of the tool body and the left part and a right spring holder connected to one of the tool body and the right part, wherein:

the left spring is arranged between the other of the tool body and the left part and the left spring holder, and the right spring is arranged between the other of the tool body and the right part and the right spring holder.

Further, it is a non-limiting object to provide a technique that helps improve the arrangement of a plurality of biasing members, in a power tool having a hammer mechanism and including a tool body, a handle having a left part and a right part and configured to be divided into the left part and the right part, and a plurality of biasing members. For this object, the following aspects 2-1 to 2-11 are provided. Aspects 2-1 to 2-11 may be adopted singly or in combination of two or more of them. Alternatively, at least one of aspects 2-1 to 2-11 may be adopted in combination with at least one of the features of the rotary hammers 1A, 1B, 1C of the above-described embodiments, the above-described modifications, aspects 1-1 to 1-7 and the claimed invention.

(Aspect 2-1) A power tool having a hammer mechanism and configured to linearly drive a tool accessory, comprising:

a motor;

a driving mechanism that is configured to drive the tool accessory along a driving axis that defines a front-rear direction of the power tool, by power of the motor;

a tool body that houses the motor and the driving mechanism and extends in the front-rear direction;

a handle including a grip part that extends in an up-down direction orthogonal to the front-rear direction behind the tool body, the handle having a first part and second part that are connected together in a left-right direction orthogonal to the front-rear direction and the up-down direction;

a first spring that is arranged between the tool body and the first part and configured to bias the tool body and the handle in directions away from each other in the front-rear direction;

a second spring that is arranged between the tool body and the second part and configured to bias the tool body and the handle in directions away from each other in the front-rear direction; and a first spring holder configured to hold the first spring and to be connected to one of the tool body and the first part, wherein:

each of the first and second springs has a first end a second end, and the first end of the first spring is connected to the one of the tool body and the first part via the first spring holder, and the second end of the first spring is directly connected to the other of the tool body and the first part.

According to aspect 2-1, in the power tool having a hammer mechanism and having the handle formed of two halves including the first and second parts, the first part and the tool body are elastically connected by the first spring and the second part and the tool body are elastically connected by the second spring. Thus, the handle is biased in a well-balanced manner on the left and right sides. Therefore, transmission of vibration from the tool body to the handle during machining operation is reduced in a well-balanced manner on the left and right sides, so that the operability of the power tool is improved. Further, the first spring is connected to one of the tool body and the first part via the first spring holder and directly connected to the other of the tool body and the first part, so that transmission of vibration is reduced without the need to provide a structure for locking the spring to one of the tool and the first part.

(Aspect 2-2) The power tool having a hammer mechanism as defined in aspect 2-1, wherein:

the first end of the first spring is connected to the tool body via the first spring holder, and the second end of the first spring is directly connected to the first part.

According to aspect 2-2, the first spring is connected to the tool body via the first spring holder.

(Aspect 2-3) The power tool having a hammer mechanism as defined in aspect 2-2, wherein:

the first spring holder has a first locking part, and the tool body has a second locking part configured to be locked to the first locking part of the first spring holder.

According to aspect 2-3, the first spring holder is connected to the tool body by locking the first locking part to the second locking part.

(Aspect 2-4) The power tool having a hammer mechanism as defined in aspect 2-3, wherein:

the tool body has a gear housing that houses the driving mechanism, and a motor housing that houses the motor behind the gear housing, the gear housing and the motor housing are connected together with screws, part of a hole formed in the motor housing for insertion of each of the screws serves as the second locking part, and the first locking part of the first spring holder has a protruding part configured to be engaged with part of the hole.

According to aspect 2-4, the first spring holder is locked to the tool body by utilizing the holes formed in the motor housing for connection with the gear housing.

(Aspect 2-5) The power tool having a hammer mechanism as defined in any one of aspects 2-1 to 2-4, wherein an outer surface of the first spring holder is continuous to an outer surface of one of the tool body and the handle.

According to aspect 2-5, the power tool having a hammer mechanism is improved in design.

(Aspect 2-6) The power tool having a hammer mechanism as defined in any one of aspects 2-1 to 2-5, further comprising:

a second spring holder configured to hold the second spring and to be connected to one of the tool body and the second part, wherein:

the first end of the second spring is connected to the one of the tool body and the second part via the second spring holder, the second end of the second spring is directly connected to the other of the tool body and the second part, and the first spring holder and the first spring, and the second spring holder and the second spring are arranged below the driving axis.

According to aspect 2-6, compared with a structure in which the first and second springs are arranged above the driving axis, a biasing force on the side close to the grip part can be larger. This suppresses tilting of the handle in a direction in which the lower end of the grip part moves toward a workpiece during machining operation.

The second spring holder may have the same structure as the first spring holder. Further, in an aspect in which the second spring holder is connected to the tool body, part of the tool body that is connected to the second spring holder may have the same structure as part of the tool body that is connected to the first spring holder.

(Aspect 2-7) The power tool having a hammer mechanism as defined in any one of aspects 2-1 to 2-6, wherein:

the tool body has a motor housing that houses the motor and is arranged in a rear part of the tool body, the handle includes a cover part that at least partially surrounds the motor housing, and an upper end of the grip part is connected to the cover part.

According to aspect 2-7, the handle is biased in a well-balanced manner on the left and right sides while the motor housing is covered with the handle.

(Aspect 2-8) The power tool having a hammer mechanism as defined in any one of aspects 2-1 to 2-7, wherein the first spring holder has an engagement part that is exposed on the outside of the first spring holder and configured to be engaged with a removing tool for removing the first spring holder from one of the tool body and the handle.

According to aspect 2-8, the first spring can be easily replaced by removing the first spring holder from the one of the tool body and the handle. Thus, maintenance of the power tool is facilitated.

(Aspect 2-9) The power tool having a hammer mechanism as defined in any one of aspects 2-1 to 2-8, wherein:

the power tool has a lever that is configured to be manually operated by a user to change a rotating direction of the motor, the cover part has an opening at least part of which is arranged on an imaginary plane including the driving axis and extending in the up-down direction, the opening being defined by connecting the first part and the second part in a left-right direction, and the lever is operably connected to the motor and protrudes to the outside from the opening.

(Aspect 2-10) A method of manufacturing a power tool having a hammer mechanism, the power tool including: a tool body that houses a motor and a driving mechanism configured to drive a tool accessory along a driving axis that defines a front-rear direction of the power tool, and extends in the front-rear direction; a handle including a grip part that extends in an up-down direction orthogonal to the front-rear direction behind the tool body, the handle having a first part and a second part that are connected together in a left-right direction orthogonal to the front-rear direction and the up-down direction; and a first spring and a second spring that are configured to bias the tool body and the handle in directions away from each other in the front-rear direction, the method comprising:

a first step of holding a rear part of the tool body between the first part and the second part and connecting the first part and the second part, and a second step of elastically connecting the tool body and the handle after the first step by assembling the first spring between the tool body and the first part while compressing the first spring and assembling the second spring between the tool body and the second part while compressing the second spring.

According to aspect 2-10, a power tool having a hammer mechanism, where the handle is configured to be divided into the first and second right parts and the first and second springs are respectively arranged (disposed) between the tool body and the first part and between the tool body and the second part, is manufactured.

(Aspect 2-11) The method as defined in aspect 2-10, wherein:

the power tool further has a first spring holder connected to one of the tool body and the first part, and a second spring holder connected to one of the tool body and the second part, the second step of the method includes:

connecting the first spring to the other of the tool body and the first part and to the one of the tool body and the first part via the first spring holder, and connecting the second spring to the one of the tool body and the second part via the second spring holder and to the other of the tool body and the second part.

According to aspect 2-11, the first and second springs are respectively arranged between the tool body and the first part and between the tool body and the second part by using the first and second spring holders. Thus, the power tool having a hammer mechanism can be easily manufactured.

Correspondences between the features of aspects 2-1 to 2-11 and the features of the present disclosure or invention are as follows. However, the features of the above-described embodiments are merely exemplary and do not limit the features of aspects 2-1 to 2-11.

The rotary hammers 1A, 1B, 1C are examples of the "power tool having a hammer mechanism". The right part 30R and the left part 30L are examples of the "first part" and the "second part", respectively. The spring holders 4R, 4L are examples of the "first spring holder" and the "second spring holder", respectively. The second biasing springs 52R, 52L are examples of the "first spring" and the "second spring", respectively. The front end 521 and the rear end 522 are examples of the "first end" and the "second end", respectively. Steps (i), (ii), (iii) are examples of the "first step". Steps (iv), (v) are examples of the "second step".

In the rotary hammer 1A, one of the left and right parts 30L, 30R and the tool body 2A may be elastically connected by the second biasing spring via the spring holder, and the other of the left and right parts 30L, 30R and the tool body 2A may be elastically connected by the second biasing spring (directly) not via the spring holder. For example, in the above-described embodiments, in step (iii) of connecting the left and right parts 30L, 30R in the left-right direction, the inner surface of the left part 30L is faced vertically upward and the inner surface of the right part 30R is faced vertically downward. Therefore, after step (iii), the second biasing spring 52R may be arranged at least between the right part 30R and the tool body 2A by using the spring holder 4R, so that the possibility that the second biasing spring 52R drops or is displaced out of the second spring holding part 35 is reduced and the rotary hammer 1A can be easily manufactured. In this case, a spring holding part for receiving the front end 511 of the second biasing spring 52L may be provided in place of the holder receiving part 63R in the tool body 2A. The second biasing spring 52L may be assembled in a compressed state between this spring holding part and the second spring holding part 35 of the left part 30L when the tool body 2A and the left part 30L are placed on a desk or the like and parts of the handle 3A are assembled to the left part 30L (in step (ii) above).

DESCRIPTION OF THE REFERENCE NUMERALS

1A, 1B, 1C: rotary hammer, 2A: tool body, 21: gear housing, 22: rear end part, 221, 222, 223, 224: first connection part, 23: motor housing, 24: front part, 241, 242, 243, 244: second connection part, 24*s*: outer surface, 28: guide part, 29: guide plate, 26: rear part, 261: L-shaped part, 263: upper wall, 265: front wall, 266: rear wall, 27: first spring holding part, 271: abutment surface, 272: holding wall, 3A: handle, 30L: left part, 30R: right part, 31: cover part, 311: opening, 33: first spring holding part, 331: abutment surface, 332: holding wall, 34: guide receiving part, 35, 35 B, 35C: second spring holding part, 351: abutment surface, 352: holding wall, 36B: second spring holding part, 361: abutment surface, 39: grip part, 391: upper end, 392: lower end, 4L, 4R: spring holder, 41: first locking part, 42: outer wall, 42*s*: outer surface, 43: support part, 431: first surface, 44: outer wall, 441: front surface, 442: rear surface, 45: engagement part, 46: protruding part, 51: first biasing spring, 511: front end, 512: rear end, 52L, 52R, 52B, 52C: second biasing spring, 521: front end, 522: rear end, 61, 62: hole, 622: opening, 63L, 63R: holder receiving part, 621: second locking part, 631: first surface, 632: second surface, 71: motor, 711: motor shaft, 72: fan, 75: driving mechanism, 751: motion converting mechanism, 752: striking mechanism, 753: rotation transmitting mechanism, 79: tool holder, 91: bellows member, 92: trigger, 93: switch, 94: power cord, 95: screw, 952: rear end, 96: lever, 101: tool accessory, A1: driving axis, A2: rotational axis, L1: distance, L2: distance, P1: imaginary plane, P2: imaginary plane

The invention claimed is:

1. A power tool having a hammer mechanism and configured to linearly drive a tool accessory, comprising:

a motor;

a driving mechanism that is configured to drive the tool accessory along a driving axis that defines a front-rear direction of the power tool, by power of the motor;

a tool body that houses the motor and the driving mechanism and extends in the front-rear direction;

a handle including a grip part, the grip part extending in an up-down direction orthogonal to the front-rear direction behind the tool body and having a lower end formed as a free end, and arranged below the driving axis; and a plurality of biasing members that are configured to elastically connect the tool body and the handle and bias the tool body and the handle in directions away from each other in the front-rear direction, wherein:

the biasing members include:

at least one first biasing member arranged above the driving axis in the up-down direction, and at least one second biasing member arranged below the driving axis in the up-down direction, a biasing force of the at least one second biasing member is larger than a biasing force of the at least one first biasing member, the handle includes an upper end, the grip part is arranged between the upper end and the free end in the up-down direction, and the handle is connected to the tool body only by the upper end.

2. The power tool having a hammer mechanism as defined in claim 1, wherein:

the at least one first biasing member and the at least one second biasing member have the same specifications, and the number of the at least one second biasing member is larger than that of the at least one first biasing member.

3. The power tool having a hammer mechanism as defined in claim 1, wherein:

the number of the at least one first biasing member is one, and the number of the at least one second biasing member is two.

4. The power tool having a hammer mechanism as defined in claim 3, wherein the two second biasing members are arranged symmetrically to an imaginary plane including the driving axis and extending in the up-down direction.

5. The power tool having a hammer mechanism as defined in claim 4, wherein the at least one second biasing spring is arranged forward of the at least one first biasing spring.

6. The power tool having a hammer mechanism as defined in claim 1, wherein the at least one second biasing spring has a larger spring constant than the at least one first biasing spring.

7. The power tool having a hammer mechanism as defined in claim 1, wherein the at least one second biasing spring is arranged between the tool body and the handle with a larger initial load applied thereto than that applied to the at least one first biasing spring.

8. The power tool having a hammer mechanism as defined in claim 1, wherein the at least one second biasing spring is arranged forward of the at least one first biasing spring.

9. The power tool having a hammer mechanism as defined in claim 1, wherein:

the tool body includes a motor housing that houses the motor and is arranged in a rear part of the tool body, the handle includes a cover part that at least partially surrounds the motor housing, and an upper end of the grip part is connected to the cover part.

10. The power tool having a hammer mechanism as defined in claim 9, wherein the cover part at least partially surrounds the motor housing in a circumferential direction around a rotational axis.

11. The power tool having a hammer mechanism as defined in claim 10, wherein:

the motor housing has a plurality of guide parts configured to guide the handle to move relative to the tool body along the driving axis, and the cover part has a plurality of guide receiving parts arranged in positions corresponding to the guide parts.

12. The power tool having a hammer mechanism as defined in claim 11, wherein:

the guide parts include a left guide part provided on the left side of an imaginary plane including the driving axis and extending in the up-down direction, and a right guide part provided on the right side of the imaginary plane, and the guide receiving parts include a left guide receiving part provided on the left side of the imaginary plane and a right guide receiving part provided on the right side of the imaginary plane.

13. The power tool having a hammer mechanism as defined in claim 1, wherein:

a rotational axis of the motor extends in parallel to the driving axis below the driving axis, and the grip part is arranged below the rotational axis.

14. The power tool having a hammer mechanism as defined in claim 13, wherein the grip part is arranged below the motor.

15. The power tool having a hammer mechanism as defined in claim 1, wherein:

the handle has a left part and a right part that are connected together in a left-right direction orthogonal to the front-rear direction and the up-down direction, the at least one second biasing member includes a left spring and a right spring, the left spring is arranged between the left part and the tool body, and the right spring is arranged between the right part and the tool body.

16. The power tool having a hammer mechanism as defined in claim 1, wherein the plurality of biasing members is configured to directly connect the tool body and upper end of the handle.

17. A power tool having a hammer mechanism and configured to linearly drive a tool accessory, comprising:

a motor;

a driving mechanism that is configured to drive the tool accessory along a driving axis that defines a front-rear direction of the power tool, by power of the motor;

a tool body that houses the motor and the driving mechanism and extends in the front-rear direction;

a handle including a grip part, the grip part extending in an up-down direction orthogonal to the front-rear direction behind the tool body and having a lower end formed as a free end, and arranged below the driving axis; and a plurality of biasing members that are configured to elastically connect the tool body and the handle and bias the tool body and the handle in directions away from each other in the front-rear direction, wherein:

the biasing members include:

at least one first biasing member arranged above the driving axis in the up-down direction, and at least one second biasing member arranged below the driving axis in the up-down direction, a biasing force of the at least one second biasing member is larger than a biasing force of the at least one first biasing member, the tool body includes a motor housing that houses the motor and is arranged in a rear part of the tool body, the handle includes a cover part that at least partially surrounds the motor housing, and an upper end of the grip part is connected to the cover part.

* * * * *